(12) United States Patent
Kivilinna et al.

(10) Patent No.: US 12,730,655 B2
(45) Date of Patent: Sep. 8, 2026

(54) TECHNIQUES FOR DEVICE FACTORY RESET AND OTHER CONTROL FUNCTIONALITIES

(71) Applicant: Oura Health Oy, Oulu (FI)

(72) Inventors: Jussi Kivilinna, Oulu (FI); Teemu Takaluoma, Oulu (FI); Michael Chapp, Lafayette, CA (US); Yogesh Pande, Oulu (FI)

(73) Assignee: Oura Health Oy, Oulu (FI)

( * ) Notice: Subject to any disclaimer, the term of this patent is extended or adjusted under 35 U.S.C. 154(b) by 89 days.

(21) Appl. No.: 18/400,277

(22) Filed: Dec. 29, 2023

(65) Prior Publication Data

US 2025/0217164 A1 Jul. 3, 2025

(51) Int. Cl.

| | |
|---|---|
| ***G06F 9/445*** | (2018.01) |
| ***G06F 3/01*** | (2006.01) |
| ***H02J 7/40*** | (2026.01) |

(52) U.S. Cl.

CPC .......... *G06F 9/44505* (2013.01); *G06F 3/014* (2013.01); *G06F 3/016* (2013.01); *G06F 3/017* (2013.01); *H02J 7/40* (2026.01)

(58) Field of Classification Search

CPC . H02J 7/0044; H02J 7/00032; G06F 9/44505; G06F 3/014; G06F 3/016; G06F 3/017

USPC .................................. 320/107–108; 713/100

See application file for complete search history.

(56) References Cited

U.S. PATENT DOCUMENTS

| | | | | |
|---|---|---|---|---|
| 10,139,906 | B1 * | 11/2018 | Bai | G06F 3/014 |
| 11,075,538 | B2 * | 7/2021 | Järvelä | G06F 1/163 |
| 11,462,107 | B1 * | 10/2022 | Sanchez | G06F 21/32 |
| 12,008,161 | B2 * | 6/2024 | Nickerson | H04R 1/028 |
| 12,100,965 | B2 * | 9/2024 | Haverinen | H02J 7/0044 |
| 2020/0233452 | A1 * | 7/2020 | von Badinski | A61B 5/747 |
| 2024/0078079 | A1 * | 3/2024 | Carrigan | G06F 3/04883 |
| 2024/0291300 | A1 * | 8/2024 | Haverinen | H01Q 1/273 |
| 2024/0291319 | A1 * | 8/2024 | Samardzija | H02J 50/12 |

(Continued)

OTHER PUBLICATIONS

Oura—"Troubleshooting Connection Issues"—Dated Dec. 5, 2022, retrieved from: https://support.ouraring.com/hc/en-us/articles/360025592013-Troubleshooting-Connection-Issues (Year: 2022).*

*Primary Examiner* — Brian T Misiura

(74) *Attorney, Agent, or Firm* — ArentFox Schiff LLP

(57) ABSTRACT

Methods, systems, and devices for wearable devices are described. In particular, the methods, systems, and devices described herein may be used to perform factory resets and perform other control actions for wearable devices without the use of user interfaces or wearable applications. A wearable device may detect that the wearable device is coupled with a charging device, and acquire motion data during a time interval that the wearable device is coupled with the charging device. The wearable device may identify a series of movements associated with the wearable device and the charging device during the time interval that the wearable device is coupled with the charging device, and compare the series of movements to a predefined reference pattern. The wearable device may then perform one or more control actions associated with the wearable device (e.g., factory reset, self-diagnostics, etc.) based on the series of movements matching the predefined reference pattern.

18 Claims, 10 Drawing Sheets

(56) References Cited

U.S. PATENT DOCUMENTS

| | | | | |
|---|---|---|---|---|
| 2024/0413651 | A1* | 12/2024 | Liang | G06F 3/03543 |
| 2025/0107753 | A1* | 4/2025 | Sippola | A61B 5/6826 |
| 2025/0112496 | A1* | 4/2025 | Sippola | H02J 7/0044 |

* cited by examiner

Reference Pattern 520

1. Ring still on charger for at least 2 seconds
2. Ref. Movement #1: Rotate ring/charger 180° (Upside-down)
3. Still for at least 2 seconds
4. Ref. Movement #2:Rotate ring/charger back 180° (Right-side-up)
5. Still for at least 2 seconds

500

700

TECHNIQUES FOR DEVICE FACTORY RESET AND OTHER CONTROL FUNCTIONALITIES

FIELD OF TECHNOLOGY

The following relates to wearable devices and data processing, including techniques for device factory reset and other control functionalities without the use of a user interface or application.

BACKGROUND

Some wearable devices may be configured to collect data from users associated with their sleep and overall health, such as temperature data, heart rate data, and the like. In some cases, there may be a desire to restore a device (e.g., wearable device) to factory settings, such as in a retail setting to prepare a wearable device for a new user. However, in cases where the wearable device does not include a user interface, restoring the wearable device to factory settings may be difficult or impossible.

DETAILED DESCRIPTION

Figure 1:
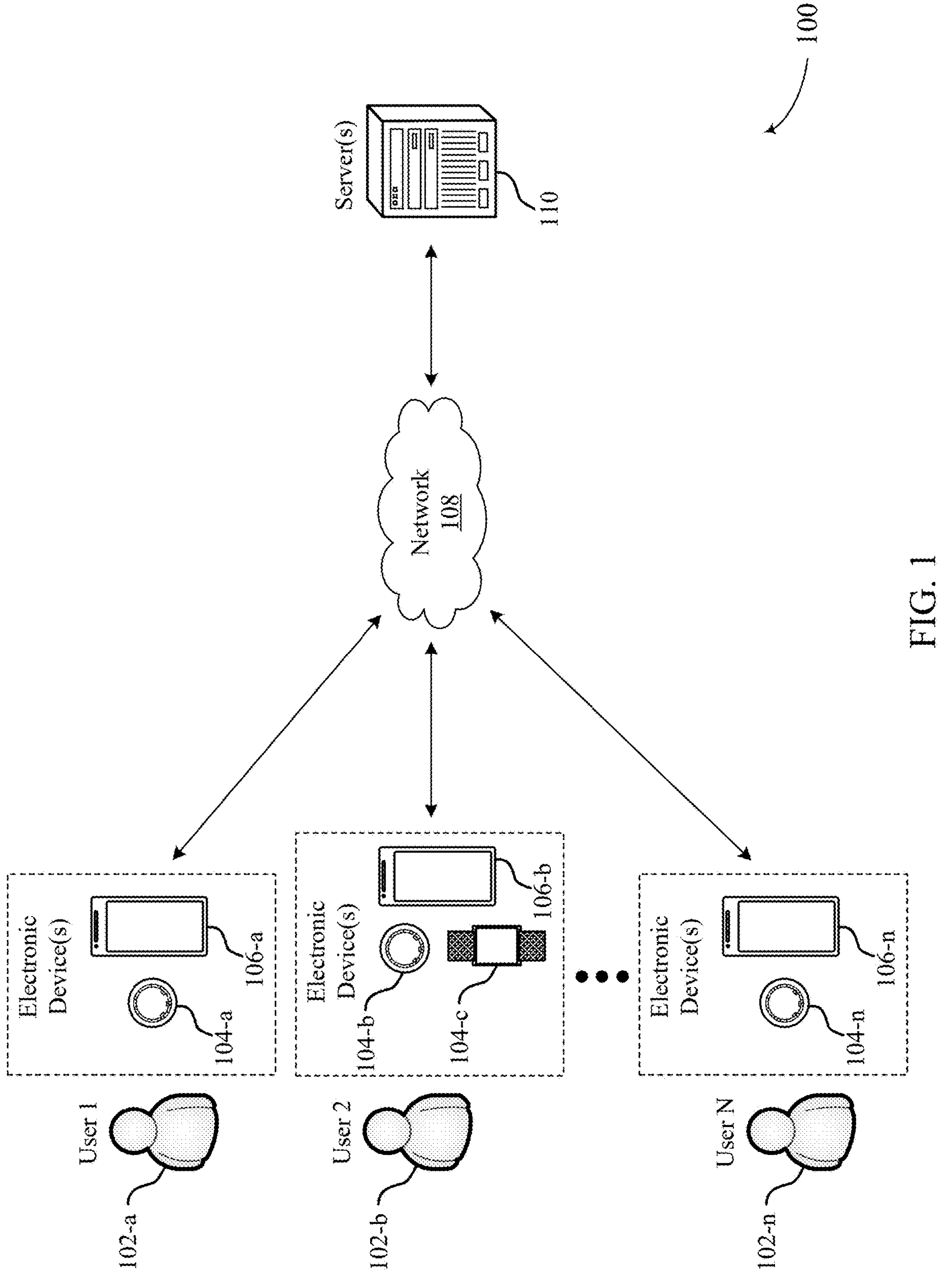
FIG. 1 illustrates an example of a system that supports techniques for device factory reset and other control functionalities in accordance with aspects of the present disclosure.

Some wearable devices may be configured to collect data from users associated with their sleep and overall health, such as temperature data, heart rate data, and the like. Most wearable devices may include a user interface (e.g., graphical user interface (GUI)) either within the wearable device itself of within an associated user device (e.g., smartphone), where the user interface is used to view data collected by the wearable device, adjust settings of the wearable device, etc.

In some cases, there may be a desire to restore a wearable device, charger, or other associated device, to factory settings, such as in a retail setting to prepare a wearable device for a new user. For instance, a first user may purchase a wearable ring device from a retail store, and may subsequently return the wearable ring device to the retail store. In cases where the wearable ring device is still in good condition, the retail store may be expected to perform some diagnostics and/or restore the wearable ring device to factory settings (e.g., remove data/settings associated with the first user) so that the wearable ring device may be re-sold to a new user. However, in this example, the wearable ring device may not include a user interface that may be used to input commands used to trigger the factory reset. Further, the wearable ring device may still be "paired" with a wearable application on the first user's smartphone, but the first user may not be present when the factory reset is to be performed. In such cases, it may be difficult or impossible to restore the wearable device to factory settings.

Accordingly, aspects of the present disclosure are directed to techniques for implementing a factory reset and/or other control actions or functionalities associated with a wearable device without the use of a user interface or other traditional input means. In particular, aspects of the present disclosure are directed to techniques for implementing a factory reset and/or other control actions or functionalities associated with a wearable device based on comparing motion patterns identified while the wearable device is connected to a charging device to a predefined reference pattern. In such cases, if the motion patterns (e.g., gestures, movements) detected while the wearable device is connected to the charging device match the predefined reference pattern, the wearable device may be triggered to perform one or more control actions, such as initiating a factory reset, performing a diagnostics procedure associated with the wearable device, rebooting/resetting a device (with or without a full factory erase/reset), uploading measurement profiles or other settings or the wearable device, performing start feature measurement without app control, performing device onboarding/initiation procedures, or any combination thereof.

For instance, continuing with the example above, the first user may return the wearable ring device to the retail store. In order to implement a factory reset for the wearable ring device, an employee of the retail store may connect the wearable ring device to a charger, and may move the ring and the charger in a particular series of movements (e.g., flip the ring/charger upside down, hold for three seconds, rotate the ring/charger 90° degrees, hold for two seconds, then return the ring/charger to an upright position). In this example, the wearable ring device may detect the series of movements, and initiate a factory reset if the series of movements matches a predefined "factory reset" reference pattern.

Aspects of the disclosure are initially described in the context of systems supporting physiological data collection from users via wearable devices. Additional aspects of the disclosure are further described in the context of an example charger diagram and an example process flow. Aspects of the disclosure are further illustrated by and described with reference to apparatus diagrams, system diagrams, and flowcharts that relate to techniques for device factory reset and other control functionalities.

FIG. 1 illustrates an example of a system 100 that supports techniques for device factory reset and other control functionalities in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, blood oxygen saturation (SpO2), blood sugar levels (e.g., glucose metrics), and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols. Moreover, in some cases, the wearable device 104 and the user device 106 may be included within (or make up) the same device. For example, in some cases, the wearable device 104 may be configured to execute an application associated with the wearable device 104, and may be configured to display data via a GUI.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs) (e.g., vertical cavity surface-emitting lasers (VCSELs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-*a* may be associated with a wearable device 104-*a* (e.g., ring 104-*a*) and a user device 106-*a*. In this example, the ring 104-*a* may collect physiological data associated with the user 102-*a*, including temperature, heart rate, HRV, respiratory rate, and the like. In some aspects, data collected by the ring 104-*a* may be input to a machine learning classifier, where the machine learning classifier is configured to determine periods of time that the user 102-*a* is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-*a* via a GUI of the user device 106-*a*. Sleep stage classification may be used to provide feedback to a user 102-*a* regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-*a* via the wearable device 104-*a*. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g. in a hypothetical culture with 12 day "weeks," 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support techniques for implementing a factory reset and/or other control actions or functionalities associated with a wearable device 104 without the use of a user interface or other traditional input means. In particular, the system 100 may support techniques for implementing a factory reset and/or other control actions or functionalities associated with a wearable device 104 based on comparing motion patterns identified while the wearable device 104 is connected to a charging device to a predefined reference pattern. In such cases, if the motion patterns detected while the wearable device 104 is connected to the charging device match the predefined reference pattern, the wearable device 104 may be triggered to perform one or more control actions, such as initiating a factory reset, performing a diagnostics procedure associated with the wearable device, uploading movement profiles or other settings or the wearable device, or any combination thereof.

For example, a first user 102 may purchase a wearable ring device 104 from a retail store, and may subsequently return the wearable ring device 104 to the retail store (either for resale or for diagnostics/repair). In cases where the wearable ring device 104 is still in good condition, the retail store may be expected to perform some diagnostics and/or restore the wearable ring device 104 to factory settings (e.g., remove data/settings associated with the first user 102) so that the wearable ring device 104 may be re-sold to a new user 102. In order to run diagnostics and/or implement a factory reset for the wearable ring device 104, an employee of the retail store may connect the wearable ring device 104 to a charger, and may move the ring and the charger in a particular series of movements (e.g., flip the ring/charger upside down, hold for three seconds, rotate the ring/charger 90° degrees, hold for two seconds, then return the ring/charger to an upright position). In this example, the wearable ring device 104 may detect the series of movements, and perform one or more control actions (e.g., perform a diagnostics procedure, initiate a factory reset, etc.) if the series of movements matches a predefined "factory reset" reference pattern.

While the example above is described in the context of a retail store restoring a device to factory settings for resale, this is not a limitation of the present disclosure. In particular, techniques described herein may be performed by users themselves to run diagnostics on their devices, reboot their devices, perform self-recovery procedures on their devices (e.g., restore their devices to a previous version of an app or previous memory state), and/or restore their devices to factory settings.

Aspects of the present disclosure may be implemented in a variety of contexts and to initiate control actions/functionalities other than implementing a factory reset. For example, aspects of the present disclosure may be used to perform diagnostics procedures of a wearable device, where the diagnostics procedures are used to communicate information about the status or health of the wearable device, such as a state of the battery of the wearable device, the current version of a software application loaded on the wearable device, and the like. Moreover, aspects of the present disclosure may be used to upload measurement profiles, algorithms, settings, software versions, etc., to the wearable device. For instance, techniques described herein may be used as a sort of "authorization" to upload a restricted or specialized version of a wearable application to the wearable device (e.g., to upload a version of an app with increased functionalities for testing, validation, etc.).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
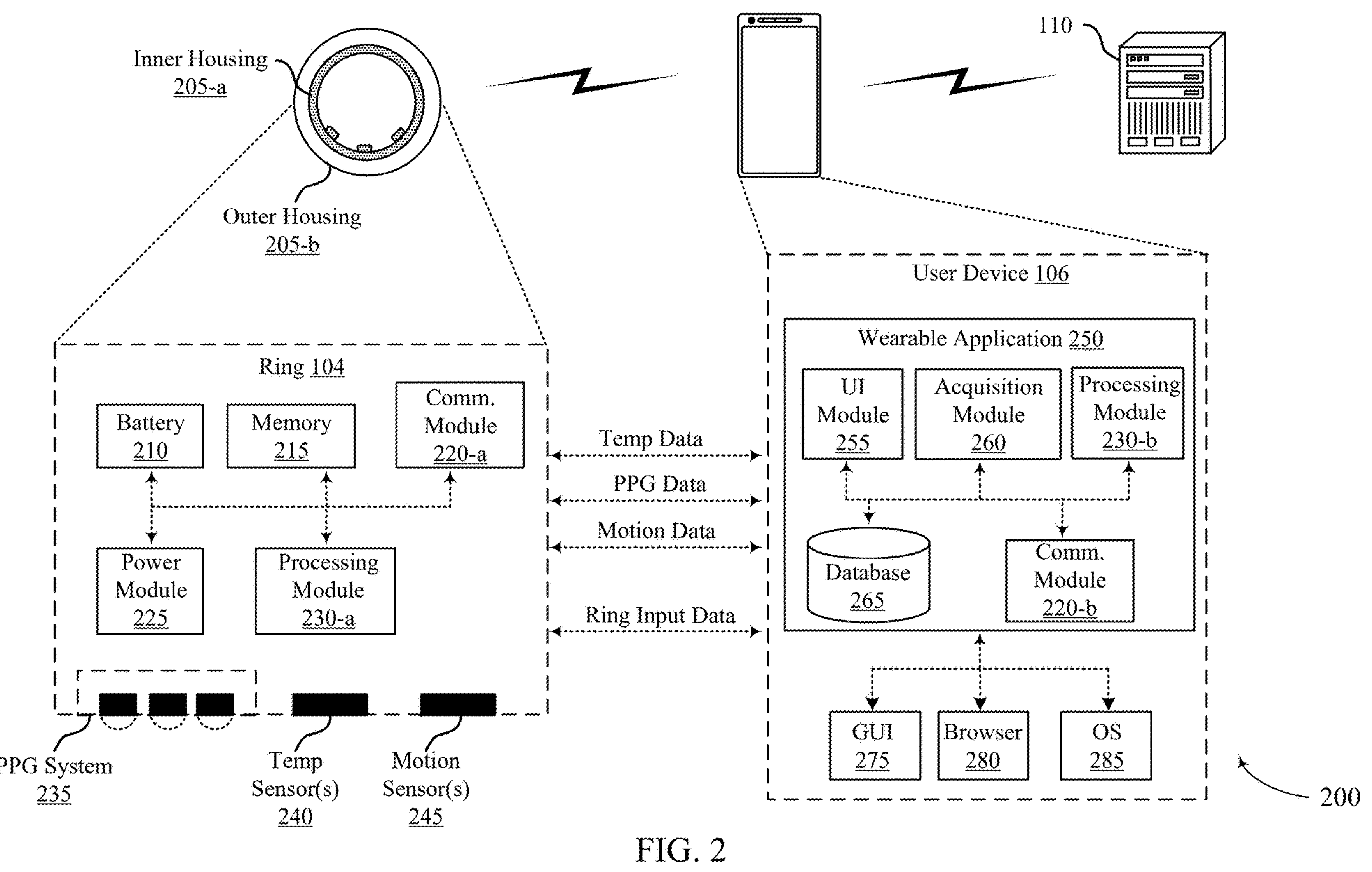
FIG. 2 illustrates an example of a system that supports techniques for device factory reset and other control functionalities in accordance with aspects of the present disclosure.

FIG. 2 illustrates an example of a system 200 that supports techniques for wearable device factory reset and other control functionalities in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels (SpO2), blood sugar levels (e.g., glucose metrics), and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-*a* and an outer housing 205-*b*. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-*a*, a memory 215, a communication module 220-*a*, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using adhesives, wraps, clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-*b* component (e.g., a shell) and an inner housing 205-*a* component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-*b* (e.g., a metal outer housing 205-*b*). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate (s) from water and/or other chemicals.

The outer housing 205-*b* may be fabricated from one or more materials. In some implementations, the outer housing 205-*b* may include a metal, such as titanium, that may provide strength and abrasion resistance at a relatively light weight. The outer housing 205-*b* may also be fabricated from other materials, such polymers. In some implementations, the outer housing 205-*b* may be protective as well as decorative.

The inner housing 205-*a* may be configured to interface with the user's finger. The inner housing 205-*a* may be formed from a polymer (e.g., a medical grade polymer) or other material. In some implementations, the inner housing 205-*a* may be transparent. For example, the inner housing 205-*a* may be transparent to light emitted by the PPG light emitting diodes (LEDs). In some implementations, the inner housing 205-*a* component may be molded onto the outer housing 205-*b*. For example, the inner housing 205-*a* may include a polymer that is molded (e.g., injection molded) to fit into an outer housing 205-*b* metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-*a* of the ring 104 may include one or more processors (e.g., processing units), microcontrollers, digital signal processors, systems on a chip (SOCs), and/or other processing devices. The processing module 230-*a* communicates with the modules included in the ring 104. For example, the processing module 230-*a* may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-*a* may communicate with the memory 215. The memory 215 may include computer-readable instructions that, when executed by the processing module 230-*a*, cause the processing module 230-*a* to perform the various functions attributed to the processing module 230-*a* herein. In some implementations, the processing module 230-*a* (e.g., a microcontroller) may include additional features associated with other modules, such as communication functionality provided by the communication module 220-*a* (e.g., an integrated Bluetooth Low Energy transceiver) and/or additional onboard memory 215.

The communication module 220-*a* may include circuits that provide wireless and/or wired communication with the user device 106 (e.g., communication module 220-*b* of the user device 106). In some implementations, the communication modules 220-*a*, 220-*b* may include wireless communication circuits, such as Bluetooth circuits and/or Wi-Fi circuits. In some implementations, the communication modules 220-*a*, 220-*b* can include wired communication circuits, such as Universal Serial Bus (USB) communication circuits. Using the communication module 220-*a*, the ring 104 and the user device 106 may be configured to communicate with each other. The processing module 230-*a* of the ring may be configured to transmit/receive data to/from the user device 106 via the communication module 220-*a*. Example data may include, but is not limited to, motion data, temperature data, pulse waveforms, heart rate data, HRV data, PPG data, and status updates (e.g., charging status, battery charge level, and/or ring 104 configuration settings). The processing module 230-*a* of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during charging, and under voltage during discharge. The power module 225 may also include electro-static discharge (ESD) protection.

The one or more temperature sensors 240 may be electrically coupled to the processing module 230-*a*. The temperature sensor 240 may be configured to generate a temperature signal (e.g., temperature data) that indicates a temperature read or sensed by the temperature sensor 240. The processing module 230-*a* may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-*a*) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-*a* may use to determine the temperature. As another example, in cases where the temperature sensor 240 includes a passive sensor, the processing module 230-*a* (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-*a* may sample the user's temperature over time. For example, the processing module 230-*a* may sample the user's temperature according to a sampling rate. An example sampling rate may include one sample per second, although the processing module 230-*a* may be configured to sample the temperature signal at other sampling rates that are higher or lower than one sample per second. In some implementations, the processing module 230-*a* may sample the user's temperature continuously throughout the day and night. Sampling at a sufficient rate (e.g., one sample per second) throughout the day may provide sufficient temperature data for analysis described herein.

The processing module 230-*a* may store the sampled temperature data in memory 215. In some implementations, the processing module 230-*a* may process the sampled temperature data. For example, the processing module 230-*a* may determine average temperature values over a period of time. In one example, the processing module 230-*a* may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-*a* near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-*a* may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-*a* may sample the sensors at different rates and average/store different values for the different sensors. In some implementations, the processing module 230-*a* may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-*a* may sample the PPG signal and determine a user's pulse waveform based on the PPG signal. The processing module 230-*a* may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-*a* may control one or both of the optical transmitters to transmit light while sampling the PPG signal generated by the optical receiver. In some implementations, the processing module 230-*a* may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-*a* may store the pulse waveform in memory 215 in some implementations. The processing module 230-*a* may process the pulse waveform as it is generated and/or from memory 215 to determine user physiological parameters described herein.

The processing module 230-*a* may determine the user's heart rate based on the pulse waveform. For example, the processing module 230-*a* may determine heart rate (e.g., in beats per minute) based on the time between peaks in the pulse waveform. The time between peaks may be referred to as an interbeat interval (IBI). The processing module 230-*a* may store the determined heart rate values and IBI values in memory 215.

The processing module 230-*a* may determine HRV over time. For example, the processing module 230-*a* may determine HRV based on the variation in the IBIs. The processing module 230-*a* may store the HRV values over time in the memory 215. Moreover, the processing module 230-*a* may determine the user's respiratory rate over time. For example, the processing module 230-*a* may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-*a* may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BM1160 inertial micro electro-mechanical system (MEMS) sensor that may measure angular rates and accelerations in three perpendicular axes.

The processing module 230-*a* may sample the motion signals at a sampling rate (e.g., 50 Hz) and determine the motion of the ring 104 based on the sampled motion signals. For example, the processing module 230-*a* may sample acceleration signals to determine acceleration of the ring 104. As another example, the processing module 230-*a* may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-*b*, a communication module 220-*b*, and a storage module (e.g., database 265) configured to store application data.

In some cases, the wearable device 104 and the user device 106 may be included within (or make up) the same device. For example, in some cases, the wearable device 104 may be configured to execute the wearable application 250, and may be configured to display data via the GUI 275.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support techniques for implementing a factory reset and/or other control actions or functionalities associated with a wearable device 104 without the use of a user interface or other traditional input means. Aspects of the present disclosure are further shown and described with reference to FIGS. 3-5.

Figure 3:
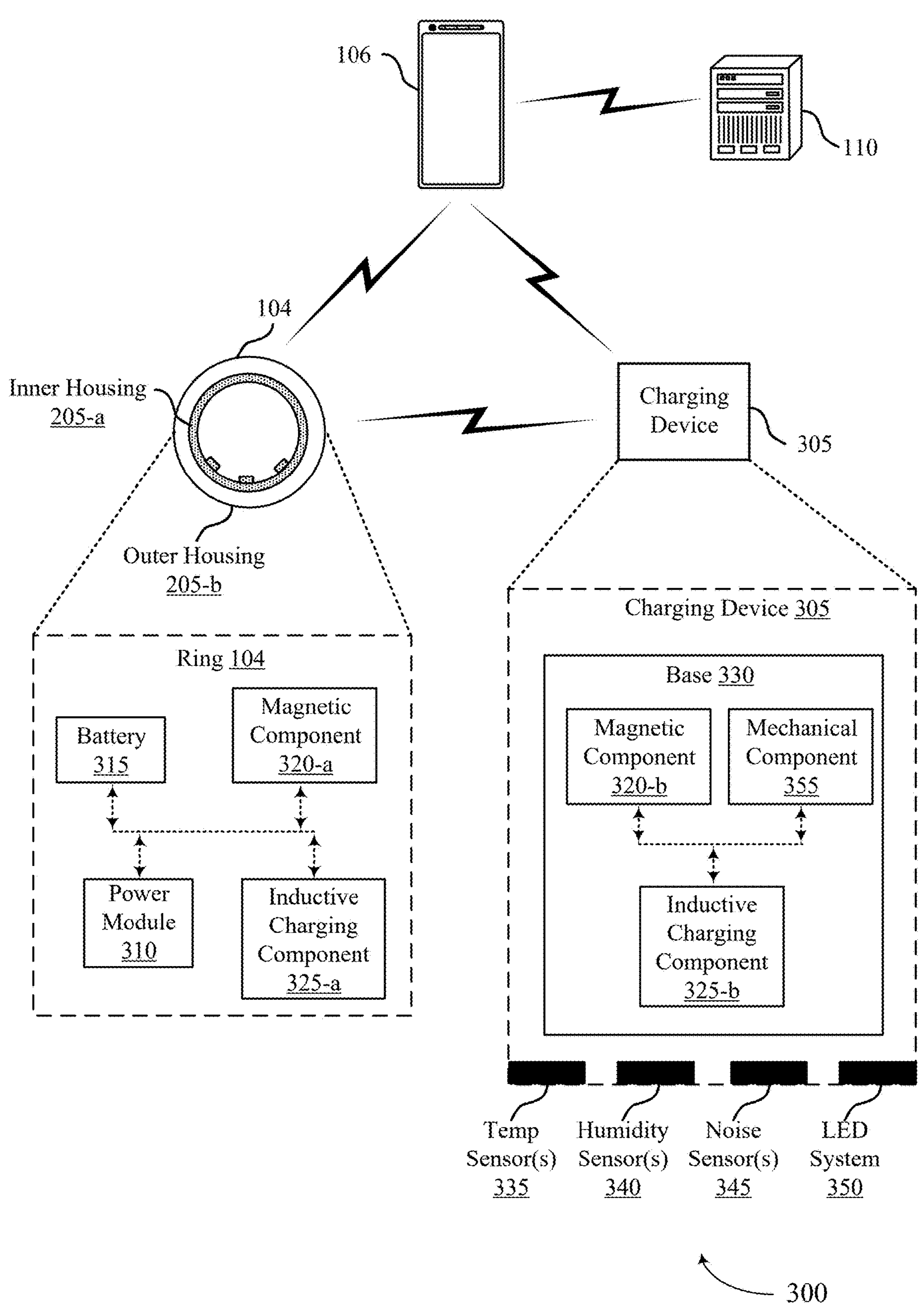
FIG. 3 shows an example of a system that supports techniques for device factory reset and other control functionalities in accordance with aspects of the present disclosure.

FIG. 3 shows an example of a system 300 that supports techniques for device factory reset and other control functionalities in accordance with aspects of the present disclosure. Aspects of the system 300 may implement, or be implemented by, aspects of the system 100, the system 200, or both. In particular, the system 300 illustrates an example of a ring 104 (e.g., wearable device 104), as described with reference to FIGS. 1 and 2, and a charging device 305.

In some aspects, the ring 104 may be configured to be worn around a user's finger, and may measure one or more user physiological parameters when worn around the user's finger. Example measurements and determinations may include, but are not limited to, user skin temperature, pulse waveforms, respiratory rate, heart rate, HRV, blood oxygen levels, and the like.

The system 300 may further include a charging device 305 in communication with the ring or with a user device 106, as described with reference to FIG. 2. The ring 104 may be in wireless and/or wired communication with a user device 106 and/or server 110. Similarly, the charging device 305 may be in wireless and/or wired communication with a user device 106, the ring 104, a server 110, or any combination thereof. In some implementations, the charging device 305 may send measured and processed data (e.g., temperature data, humidity data, noise data, and the like) to the user device 106, the ring 104, or both. Various data processing procedures described herein may be performed by any of the components of system 300, including the ring 104, charging device 305, user device 106, server 110, or any combination thereof.

Data may be collected and analyzed via one or more components of the system 300. Moreover, in some implementations, the charging device 305 may be configured to collect and analyze data, including ambient temperature data, noise data, humidity data, and the like. For example, the user device 106 may determine a correlation between sleep data from the ring 104 and the measured and processed data from the charging device 305 (e.g., user device 106 may determine that the user receives poor sleep if the ambient air temperature is over 70° F.). In other words, data collected via the charging device 305 (e.g., ambient air temperature data, noise data) may be used to further analyze physiological data collected via the ring 104.

The ring 104 may include an inner housing 205-*a* and an outer housing 205-*b*, as described with reference to FIG. 2. In some aspects, the housing 205 of the ring 104 may store or otherwise include various components of the ring 104 including, but not limited to, device electronics (e.g., a power module 310, which may be an example of a power module 225 as described with reference to FIG. 2), a power source (e.g., battery 315, which may be an example of a battery 210 as described with reference to FIG. 2, and/or capacitor), one or more substrates (e.g., printable circuit boards) that interconnect the device electronics and/or power source, and the like. In some examples, the housing 205 may also store a magnetic component 320-*a* (e.g., ferrite tape, other charging magnet, a transmitter coil, a rare earth magnet, or the like) and an inductive charging component 325 (e.g., inductive charging component 325-*a*).

The ring 104 shown and described with reference to FIGS. 2 and 3 is provided solely for illustrative purposes. As such, the ring 104 may include additional or alternative components as those illustrated in FIGS. 2 and 3. Other rings 104 that provide functionality described herein may be fabricated. For example, rings 104 with fewer components (e.g., sensors) may be fabricated. In a specific example, a ring 104 may include ferrite tape, which may act as both the magnetic component 320-*a* and the inductive charging component 325-*a*. In other cases, the ring 104 may include a dedicated charger magnet. For example, the ring 104 may include a metal plate and/or ferrite tape disposed proximate to a charger magnet.

In some examples, the ring 104 may be in electronic communication with the charging device 305. The charging device 305 may charge the battery 315 of the ring 104. The charging device 305 may include a base 330, which may store or otherwise include various components of the charging device 305. In some aspects, the base 330 of the charging device 305 may store or otherwise include various components of the charging device 305 including, but not limited to, a magnetic component 320-*b* (e.g., ferrite tape, a transmitter coil, a rare earth magnet, or the like), an inductive charging component 325-*b*, and a mechanical component 355.

In some cases, the magnetic component 320-*b* of the base 330 may include multiple magnets arranged according to a pattern based on a polarity of each magnet. For example, each magnet may have a polarity facing outward towards the surface of the charging device 305 to attract the magnetic component 320-*a* of the ring 104 with an opposite polarity. In other words, the magnetic component 320-*b* of the charging device 305 may be configured to attract/interact with the magnetic component 320-*a* of the ring 104 to help align the ring 104 in the proper position/orientation on/within the charging device 305 for charging (e.g., help align the inductive charging components 325).

The inductive charging component 325-*b* of the charging device 305 (e.g., transmitter coil, ferrite tape) may couple with inductive charging component 325-*a* of the ring 104 (e.g., receiver coil, ferrite tape) to charge the battery 315 of the ring 104. Inductive charging may also be referred to as wireless charging, and may allow power to transfer from the charging device 305 to the battery 315 of the ring 104 using electromagnetic induction. Although the charging device 305 and the ring 104 are illustrated as including inductive charging components 325, the charging device 305 and the ring 104 may include any type of charging components, such as wired charging components.

In some examples, the charging device 305 may include one or more temperature sensors 335. The temperature sensors 335 may measure an average air temperature over a duration, may continuously measure air temperature, or both. Similarly, the charging device 305 may include one or more humidity sensors 340. The humidity sensors 340 may measure an average humidity level over a duration, may continuously measure humidity level, or both. The humidity sensors 340 may measure the humidity as a percentage (e.g., 35% humidity). The charging device 305 may include one or more noise sensors 345. The noise sensors 345 may measure a noise level (e.g., in decibels) averaged over a duration, continuously, or both. The charging device 305 may store the humidity measurements, the temperature measurements, the noise measurements, or a combination thereof.

The charging device 305 may include any type of sensor known in the art, and may be configured to collect any type of data which may be used to provide insight into a user's environment and overall health. For example, the charging device 305 may include light sensors configured to measure an amount of light and/or type of light (e.g., wavelength). In such cases, the system 300 may be configured to determine whether light levels and/or which types of light may result positively or negatively affect a user's sleep and health (e.g., determine if blue light is more disruptive to a user's sleep as compared to red light). By way of another example, the charging device may include air quality sensors configured to measure air quality, pollutants, allergens, and the like. Data collected via sensors of the charging device may be leveraged to determine how a user's surrounding environment may affect their physiological data, sleep, and overall health. A processing module, such as a processing module 230 as described with reference to FIG. 2, at the user device 106 or at the charging device 305 may process the data from the temperature sensors 335, the humidity sensors 340, the noise sensors 345, light sensors, air quality sensors, or a combination thereof.

In some examples, the servers 110, user device 106, and/or charging device 305 may process the data from the temperature sensors 335, the humidity sensors 340, the noise sensors 345, or a combination thereof in conjunction with data from the ring 104. For example, the user device 106 may receive physiological data collected by the ring 104 which reflects one or more sleep cycles of a user, and may use the data from the sensors at the charging device 305 to determine a correlation between the collected physiological data and data collected by the charging device 305. For example, the user device 106 may determine a correlation over a time interval between data collected by the charging device 305 (e.g., ambient temperature data, humidity data, noise data, and the like) with a quality of sleep for the user (as determined by collected physiological data). In other words, the system 300 may be configured to identify whether high/low temperature, humidity, and/or noise levels result in a disruption of the user's sleep cycles (e.g., low ambient temperature and humidity levels result in higher quality sleep, higher noise levels result in lower quality sleep).

Although the charging device 305 is illustrated as including temperature sensors 335, humidity sensors 340, and noise sensors 345, the charging device 305 may include any quantity and type of sensors in one or more locations. For example, the charging device may also include a motion sensor, a light sensor, or the like.

In some cases, the charging device 305 may include an LED system 350. The LED system 350 may display one or more indications to a user of the ring 104. For example, the LED system 350 may display a battery level of the battery 315, a battery health/charge status (e.g., end of battery life), a time of day, connectivity issues, one or more scores of the user (e.g., a sleep score related to how well a user slept, a readiness score or level, an activity level, or the like). Additionally, or alternatively, the LED system 350 may display one or more alerts to the user (e.g., action items prompting the user to perform an action, and the like). The LED system 350 may display a battery level of the battery 315 of the ring 104 as a percentage of total battery by displaying the numbers of the percentage, by illuminating a portion of LEDs (e.g., if a battery level is at 50%, five of ten LEDs may be displayed), or the like. The LEDs in the LED system 350 may be oriented in any arrangement on the charging device 305, may be any color combination (e.g., red LED, blue LED, green LED), and there may be any quantity of LEDs in the LED system 350.

In some implementations, the charging device 305 may include a wired or wireless power source. For example, in some cases, the charging device 305 may be coupled with an electrical outlet or other power source. In other cases, the charging device 305 may include a battery or other internal power source to enable mobile charging of the ring 104. For example, in some implementations, the charging device 305 may include a battery or other internal power source such that a user may physically wear or carry the charger along with the ring 104 for mobile charging. For instance, the charging device 305 may be worn on a necklace so that a user may wear the charger while simultaneously charging the ring 104. In other cases, the charging device 305 may be coupled with the ring 104 (e.g., magnetically coupled, mechanically snapped onto) the ring 104 while the ring 104 is being worn so that the ring 104 may be charged (and continue to collect physiological data) as it is worn.

In some examples, the charging device 305 may include one or more mechanical components 355 on or within the base 330 of the charging device 305 that help align and hold rings 104 of varying sizes against a charging component (e.g., inductive charging component 325-*b*) of the charging device 305 to facilitate charging of the battery 315. The one or more mechanical components 355 (e.g., springs, flaps, magnetic components, or other components) may apply a force to help position the ring 104 firmly against the charging device 305 to facilitate charging.

Moreover, the mechanical components 355 of the charging device 305 may help orient the ring 104 in a radial orientation which allows for a charging process (e.g., an inductive charging process) by aligning charging components (e.g., inductive charging components 325, coils) within the ring 104 with the charging components of the charging device 305. For example, the ring 104 may be oriented (e.g., by a user 102) in one of a plurality of radial orientations, where the positioning of the charging components of the ring 104 may vary based on the radial orientation. However, the charging components may not be within a threshold distance for effective charging at some of the plurality of radial orientations, and the ring 104 may charge slowly or not charge when oriented in these radial orientations. Accordingly, the mechanical components 355 may be configured to position the ring 104 in a single radial orientation relative to the charging device 305 of the plurality of radial orientations. In the single radial orientation, the charging components of the ring 104 may be positioned and maintained within the threshold distance of the charging components of the charging device 305, thereby enabling effective charging of the ring 104.

Additionally, or alternatively, the magnetic component 320-*b* may help exert a force against the ring 104 (e.g., by interacting with the magnetic component 320-*a*) to further help orient the ring 104 in the correct orientation on the charging device 305 for charging. In some cases, a magnetic force exerted by the magnetic component 320-*b* may prevent the ring 104 from coupling with the charging device 305 when the ring 104 is oriented in a subset of the plurality of radial orientations excluding the single radial orientation.

In some aspects, techniques described herein may be used to initiate control actions at the ring 104 (e.g., factory reset, diagnostic procedures, etc.) based on motion data collected by the ring 104 and/or charging device 305 while the ring 104 is coupled with the charging device 305. As such, techniques described herein may be used to initiate a factory reset of the ring 104 and/or other control actions at the ring 104 without the use of the user device 106.

Figure 4:
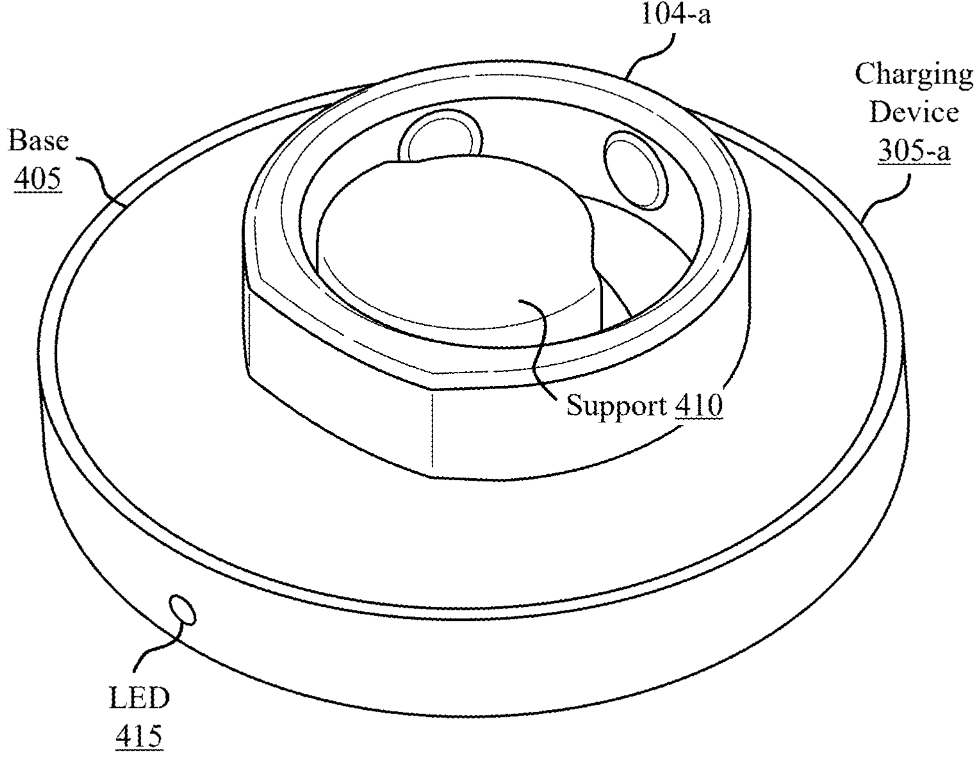
FIG. 4 shows an example of a charger diagram that supports techniques for device factory reset and other control functionalities in accordance with aspects of the present disclosure.
Figure 4:

FIG. 4 shows an example of a charger diagram 400 that supports techniques for device factory reset and other control functionalities in accordance with aspects of the present disclosure. Aspects of the charger diagram 400 may implement, or be implemented by, aspects of the system 100, the system 200, the system 300, or any combination thereof. For example, the charger diagram 400 illustrates a wearable device 104-*a* and a charging device 305-*a*, which may be examples of a wearable device 104 and a charging device 305 as described with reference to FIG. 3.

In some examples, the charging device 305-*a* may include a base 405 and a support 410 (e.g., a supporting component). The charging device 305-*a* may be manufactured according to an inner diameter of the wearable device 104-*a*. Moreover, the charging device 305-*a* may be manufactured to provide wireless charging to wearable devices 104-*a* of multiple sizes. In this regard, a circumference and/or diameter of the support 410 may be smaller than an inner diameter of a smallest wearable device 104 (e.g., of a plurality of wearable devices 104 of different sizes), such that the smallest wearable device 104-*a* may be positioned around the support 410. Further, any wearable device 104-*a* of the multiple sizes may at least partially surround the support 410, enabling the wearable device 104-*a* to couple with the support 410 for charging.

The charging device 305-*a* may include one or more mechanical components (e.g., mechanical components 355) on or within the base 405 or the support 410 of the charging device 305-*a* to help align and hold the wearable device 104-*a* against charging components of the charging device 305-*a*. For example, the charging device 305-*a* may include one or more flaps, springs, or other mechanical components that exert a mechanical force against the wearable device 104-*a* to help position the wearable device 104-*a* on the charging device 305-*a* for charging. Additionally, or alternatively, the charging device 305-*a* may include one or more components to magnetically attract a magnetic component on or within the wearable device 104-*a*, as shown and described in FIG. 3. For example, a support 410 of the charging device 305-*a* may include a magnet (e.g., a rare earth magnet, ferrite tape, a transmitter coil, or the like), and wearable device 104-*a* may include a similar magnet. The magnets or magnetic components may create a magnetic force (e.g., a mechanical force exerted via the magnets) to orient the wearable device 104-*a* in a charging position and to ensure a charging component of the wearable device 104-*a* remains within a threshold distance of charging components of the charging device 305-*a* located within the support 410.

In some cases, the wearable device 104-*a* may be oriented (e.g., by a user 102) in one of a plurality of radial orientations (e.g., defined relative to an axis of the support 410), where a positioning of the charging component of the wearable device 104-*a* may vary based on the radial orientation. However, the charging component may not be within the threshold distance at some of the plurality of radial orientations, and the wearable device 104-*a* may charge slowly or not charge when oriented in these radial orientations. Accordingly, the mechanical force exerted by the mechanical components and/or the magnetic force exerted by the magnetic components may be configured to position the wearable device 104-*a* on the base 405 in a single radial orientation of a plurality of radial orientations. In the single radial orientation, the charging components of the wearable device 104-*a* may be positioned and maintained within the threshold distance of the charging components of the charging device 305-*a*, thereby enabling effective charging of the wearable device 104-*a*. Additionally, or alternatively, the mechanical and/or magnetic force(s) may prevent the wearable device 104-*a* from coupling with the charging device 305-*a* (e.g., the base 405) when the wearable device 104-*a* is oriented in a subset of the plurality of radial orientations excluding the single radial orientation.

In some examples, the magnetic components of the charging device 305-*a* may be configured to exert a tangential force (e.g., rotational force) on the wearable device 104-*a*, where the mechanical components exert a linear force against the wearable device 104-*a* (e.g., toward the support 410). In some cases, the mechanical and magnetic forces may or may not be aligned with one another. For example, in some cases, a direction of the mechanical force may be substantially perpendicular to a direction of the magnetic force. For example, the mechanical force may "push" the ring toward the support 410, where the tangential force (e.g., which may be based at least partly on the magnetic force) may be exerted relative to an axis of the base 405 (e.g., rotational force around the support 410), such that the tangential force arranges the wearable device 104-*a* in the single radial orientation. In some examples, the tangential force may rotate the wearable device 104-*a* in a clockwise or a counterclockwise direction (e.g., relative to the axis of the base 405) to position the wearable device 104-*a* in the single radial orientation. In some examples, to facilitate positioning of the wearable device 104-*a*, magnetic components of the charging device 305-*a* (e.g., within the base 405 or the support 410) may be arranged in a pattern. The pattern may be based on a polarity of each magnet of a plurality of magnets of the charging device 305-*a*, which may enhance attraction to magnetic components of the wearable device 104-*a*.

In some examples, charging device 305-*a* may include an LED 415 (e.g., GUI or other light-emitting component) to display a charging status. For example, the LED 415 may blink while wearable device 104-*a* is actively charging, and may turn solid when wearable device 104-*a* has reached a maximum or threshold charge. Additionally, or alternatively, the LED 415 may emit a first color while the wearable device 104-*a* is actively charging and a second color when wearable device 104-*a* has reached a maximum or threshold charge.

In some cases, the LED 415 may indicate one or more alerts to the user (e.g., by changing colors, blinking, flashing, etc.). For example, the LED 415 may turn red if there is a charging malfunction (e.g., connectivity issues), or the like. In some cases, the support 410 may be capable of charging multiple wearable devices 104. The LED 415 may indicate which of the multiple rings or other wearable devices may be charged using different colors or flashing patterns.

In some aspects, techniques described herein may be used to initiate control actions at the wearable device 104-*a* (e.g., factory reset, diagnostic procedures, etc.) based on motion data collected by the wearable device 104-*a* and/or charging device 305-*a* while the wearable device 104-*a* is coupled with the charging device 305-*a*. As such, techniques described herein may be used to initiate a factory reset of the wearable device 104-*a* and/or other control actions at the wearable device 104-*a* without the use of a user device 106. Moreover, techniques described herein may be used to perform a factory reset and/or other control actions at the charging device 305-*a*, other associated devices (e.g., other wearable devices), or any combination thereof. For example, in some cases, initiation of a factory reset procedure (or other control action) may also initiate a factory reset procedure of the corresponding charging device 305-*a* and/or other associated devices, such as other wearable devices 104 that are paired with or otherwise associated with the wearable device 104-*a*.

For example, in order to perform various control actions/operations on the wearable device 104-*a* (e.g., run diagnostics, implement a factory reset, upload measurement profiles or other settings, etc.), a user may connect the wearable device 104-*a* to the charging device 305-*a* (e.g., place the wearable device 104-*a* on the charging device 305-*a* for charging, as shown), and may move the wearable device 104-*a* and the charging device 305-*a* in a particular series of movements, while maintaining the connection between the wearable device 104-*a* and the charging device 305-*a*. For instance, the user may flip the ring/charger upside down, hold for three seconds, rotate the ring/charger 90° degrees, hold for two seconds, then return the ring/charger to an upright position. In this example, motion sensors within the wearable device 104-*a* (and/or within the charging device 305-*a*) may detect the series of movements, and perform one or more control actions (e.g., perform a diagnostics procedure, initiate a factory reset, etc.) if the series of movements matches a predefined reference pattern.

In some cases, the LED 415 of the charging device 305-*a* may be used to indicate a success (or failure) of the series of motions performed to initiate the control actions (e.g., factory reset, diagnostics). In some aspects, the LED 415 may flash different colors after each motion/step to indicate whether or not the respective motion/step for the predefined reference pattern was performed successfully. For instance, the LED 415 may flash green when respective motions/steps for implementing a control action are performed successfully, and may flash red when respective motions/steps for implementing a control action are performed incorrectly (or out of order). Moreover, the LED 415 may flash different colors to indicate a result of the one or more control actions (e.g., whether or not the control actions were successfully performed).

Figure 5:
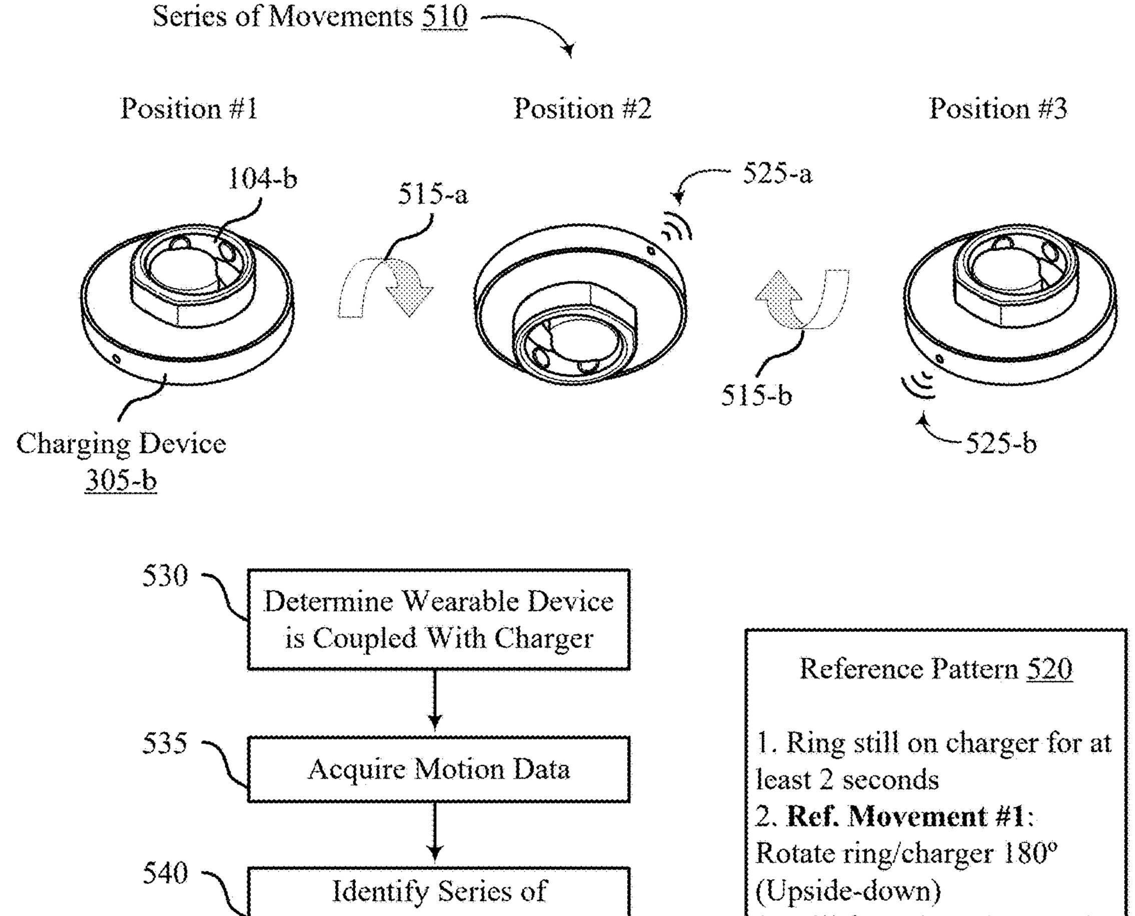
FIG. 5 shows an example of a process flow that supports techniques for device factory reset and other control functionalities in accordance with aspects of the present disclosure.
Figure 5:
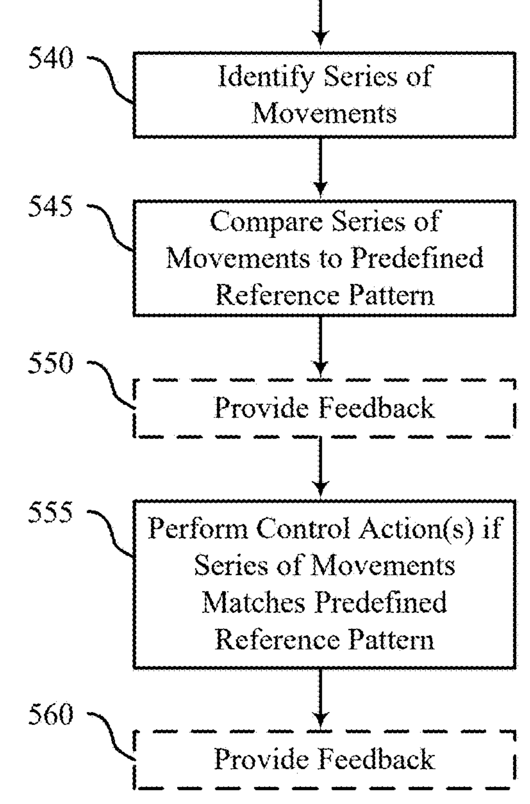

FIG. 5 shows an example of a process flow 500 that supports techniques for device factory reset and other control functionalities in accordance with aspects of the present disclosure. Aspects of the process flow 500 may implement, or be implemented by, aspects of the system 100, the system 200, the system 300, the charger diagram 400, or any combination thereof. For example, the process flow 500 illustrates a wearable device 104-*b* and a charging device 305-*b*, which may be examples of the wearable device 104-*a* and the charging device 305-*a* shown and described in FIG. 4.

The steps/functions of the process flow 500 may support techniques for implementing a factory reset and/or other control actions or functionalities associated with a wearable device 104-*a* without the use of a user interface or other traditional input means. In particular, the process flow 500 may support techniques for implementing a factory reset and/or other control actions or functionalities associated with the wearable device 104-*b* based on comparing motion patterns identified while the wearable device 104-*b* is connected to a charging device 305-*b* to a predefined reference pattern.

At step 530, the wearable device 104-*b* may determine or detect when the wearable device 104-*b* is coupled with the charging device 305-*b*. For example, the wearable device 104-*b* may be placed on the charging device 305-*b* in Position #1 and may begin a charging procedure, thereby indicating that the wearable device 104-*b* is coupled with the charging device 305-*b*. In cases where the wearable device 104-*b* is fully charged (and therefore does not "charge" when placed on the charging device 305-*b*), the wearable device 104-*b* may nonetheless detect some load (e.g., inductive load, galvanic load, UART load) between the charging components of the wearable device 104-*b* and the charging device 305-*b*, and may thereby detect that the wearable device 104-*b* is "coupled with" the charging device 305-*b* based on the load sensed on/by the charging components.

At step 535, the wearable device 104-*b* may collect motion data using one or more sensors of the wearable device 104-*b*. In cases where the charging device 305-*b* has motion sensors, the motion data collected at 535 may additionally or alternatively be detected using the motion sensors of the charging device 305-*b*. In some cases, the wearable device 104-*b*, the charging device 305-*b*, or both, may evaluate motion data collected during a time interval that the wearable device 104-*b* is coupled with the charging device 305-*b* in order to evaluate whether or not to perform control actions at the wearable device 104-*b*, such as initiating a factory reset procedure, a partial reset procedure, a diagnostics procedure, uploading measurement profiles or settings to the wearable device 104-*b*, or any combination thereof.

At step 540, the wearable device 104-*b* (and/or the charging device 305-*b*) may identify, based on the motion data acquired at 535, a series of movements 510 associated with the wearable device 104-*b* and the charging device 305-*b* during the time interval that the wearable device 104-*b* is coupled with the charging device 305-*b*. For example, while the wearable device 104-*b* is coupled with the charging device 305-*b*, a user may manipulate or move the wearable device 104-*b* and the charging device 305-*b* through the series of movements 510, which may be detected via the motion data collected at step 535. The movements 515 within the series of movements 510 may include rotations (e.g., clockwise, counterclockwise), lateral movements (e.g., movements in the X, Y, Z direction), gestures (e.g., tapping or knocking the wearable device 104-*b* and/or charging device 305-*b* against a surface), and the like.

For instance, the user may move the wearable device 104-*b* and the charging device 305-*b* according to a first movement 515-*a* where the user flips the wearable device 104-*b* and the charging device 305-*b* upside-down (e.g., 180° rotation) to Position #2, and a second movement 515-*b* where the user flips the wearable device 104-*b* and the charging device 305-*b* right-side-up (e.g., 180° rotation) to Position #3 (where Position #3 may be the same or different as Position #1). In some cases, the wearable device 104-*b*, the charging device 305-*b*, or both, may track an orientation of a defined axis of one (or both) of the devices in order to identify the respective movements 515 within the series of movements 510.

In some aspects, each movement 515 may be expected or required to be preceded by a static period and/or followed by a static period in order to be recognized for triggering a control action. Such a requirement may prevent unintentional movements of the charging device 305-*b* (e.g., charging device 305-*b* falling off a nightstand) from triggering control actions. For example, the user may be required to hold the wearable device 104-*b* and the charging device 305-*b* still for at least one second before and after each of the respective movements 515-*a*, 515-*b* in order for the movements 515 to be recognized and evaluated as potentially indicating a control action.

In some aspects, the series of movements 510 that are compared evaluated as potentially triggering a control action/function may include only those movements 515 that are identified during a time that the wearable device 104-*b* is coupled with the charging device 305-*b*. This may prevent a user from unintentionally triggering a factory reset procedure (or other control action) while the user is exercising, doing housework, etc. In particular, by evaluating only the motion data collected while the wearable device 104-*b* is coupled with the charging device 305-*b*, techniques described herein may prevent control actions from being triggered when the user is wearing the wearable device 104-*b*. Moreover, by evaluating only the motion data collected while the wearable device 104-*b* is coupled with the charging device 305-*b*, techniques described herein may reduce a quantity of motion data that is to be evaluated for triggering control actions (as the system would not evaluate motion data collected while the wearable device 104-*b* is being worn, at least for the purpose of triggering control actions).

At step 545, the wearable device 104-*b* (and/or the charging device 305-*b*) may compare the series of movements 510 to one or more predefined reference patterns 520. In some aspects, predefined reference patterns 520 may be associated with (and used to trigger) corresponding control actions at the wearable device 104-*b* and/or charging device 305-*b*. For example, a first predefined reference pattern 520 may be used to initiate a factory reset procedure at the wearable device 104-*b*, where the settings of the wearable device 104-*b* are erased and restored to factory settings (e.g., user-specific data erased, settings restored to default settings, etc.). By way of another example, a second predefined reference pattern 520 may be used to initiate a diagnostics procedure in which the wearable device 104-*b* evaluates a performance, quality, or setting of one or more components of the wearable device 104-*b* (e.g., evaluate processors, memory, sensors, current wearable software application, etc.).

In some cases, the predefined reference patterns 520 may include default reference patterns that are predefined by the manufacturer of the wearable device 104-*b*, and stored within a memory of the wearable device 104-*b* (and/or charging device 305-*b*) during the manufacturing process. In other cases, users or administrators may be able to manually define respective predefined reference patterns 520 and corresponding control actions. For example, different retail stores may have specific predefined reference patterns 520 that are used to perform factory reset procedures for the same brand of wearable device 104. In such cases, a user may be able to define a reference pattern 520 through a "training procedure" by coupling a wearable device 104-*b* to a charging device 305-*b*, performing one or more movements 515 for the reference pattern 520, and providing some user input that indicates one or more control actions/functions that are to be performed upon identification of a series of movements 510 that matches the predefined reference pattern 520.

The predefined reference patterns 520 may be associated with a series of reference movements. Additionally, or alternatively, the predefined reference patterns 520 may be associated with static periods, time constraints corresponding to the reference movements, etc. For example, as shown in FIG. 5, the predefined reference pattern 520 may be identified when the wearable device 104-*b* is still on the charging device 305-*b* for at least two seconds (e.g., static period), followed by a first reference movement where the wearable device 104-*b* and charging device 305-*b* are flipped upside down, followed by a second static period, followed by a second reference movement where the wearable device 104-*b* and charging device 305-*b* are flipped right-side up, followed by a third static period. In this example, in order for the predefined reference pattern 520 to be identified (thereby triggering the control action corresponding to the predefined reference pattern 520), the respective static periods and reference movements may be required to be performed in order and within certain time durations (e.g., time criteria) from one another. For example, the second reference movement may be expected to be performed no later than five seconds following the first reference movement.

In some cases, the reference movements within the predefined reference pattern 520 may be associated with certain tolerances or thresholds such that respective movements 515 within the series of movements 510 may be determined to "match" corresponding reference movements within the predefined reference pattern 520 as long as the respective movements fall within the respective tolerances/thresholds. For example, referring to the second reference movement of the predefined reference pattern 520 (e.g., 180° flip upside-down), a movement 515 may be determined to "match" the second reference movement as long as the charging device 305-*b* and wearable device 104-*b* are rotated between 170° and 190° relative to vertical. In some cases, different reference movements may be associated with different "tolerance" or thresholds for identifying matching movements 515 performed by the user. Moreover, in some cases, a user may be able to adjust the tolerances/thresholds for identifying a series of movements 510 that match the predefined reference patterns 520 (e.g., adjust how "sensitive" or "strict" the system is for identifying matching movements 515).

At step 550, the wearable device 104-*b*, the charging device 305-*b*, or both, may provide feedback 525 to the user, where the feedback indicates whether or not the series of movements 510 has been performed successfully or correctly (e.g., feedback indicates whether the series of movements 510 matches the predefined reference pattern 520). For example, the wearable device 104-*b* may determine whether or not the series of movements 510 matches the predefined reference pattern 520, and may transmit signals to the charging device 305-*b* to cause the charging device 305-*b* to provide feedback 525 to the user to indicate whether or not the series of movements 510 were performed correctly.

The wearable device 104-*b*, the charging device 305-*b*, or both, may be configured to provide feedback 525 to the user to indicate whether or not the series of movements 510 matches the predefined reference pattern 520. For example, the feedback 525 may include visual feedback (e.g., LEDs), audio feedback, haptic feedback, or any combination thereof. As such, the feedback 525 may be generated by light-emitting components (e.g., LEDs 415 of the charging device 305-*b*, LEDs of the wearable device 104-*b* used to acquire physiological data), haptic feedback components, audio components, or any combination thereof.

Moreover, the characteristics of the feedback 525 may be used to indicate whether or not the series of movements 510 match the predefined reference pattern 520 (e.g., positive or negative feedback). For example, the charging device 305-*b* may flash the LEDs 415 green (e.g., green feedback 525) if the series of movements 510 matches the predefined reference pattern 520, and may flash the LEDs 415 red (e.g., red feedback 525) if the series of movements 510 does not match the predefined reference pattern 520. Other characteristics that may be used to indicate a result of the comparison may include different strobing/haptic patterns, different audio sounds, etc.

In some cases, the wearable device 104-*b* may use wireless signals (e.g., Bluetooth signals) to instruct the charging device 305-*b* to generate the feedback 525, and/or to indicate what type of feedback to provide (e.g., characteristics of the feedback 525 that indicate whether or not the series of movements 510 match the predefined reference pattern 520). In additional or alternative cases, the wearable device 104-*b* may instruct the charging device 305-*b* to generate the feedback 525 using light-based signals (e.g., one-directional IR communications). For instance, after performing the comparison at 545, the wearable device 104-*a* may activate an IR LED of the wearable device 104-*b* (which may additionally be used to collect physiological data) in different patterns or with different intensities to indicate a result of the comparison. For example, a first LED strobing pattern or brightness/intensity may indicate for the charging device 305-*b* to provide positive feedback (e.g., series of movements 510 matches the predefined reference pattern 520), where a second LED strobing pattern or brightness/intensity may indicate for the charging device 305-*b* to provide negative feedback (e.g., series of movements 510 does not match the predefined reference pattern 520). In such cases, the charging device 305-*b* may include one or more light-receiving components (e.g., PDs) configured to receive and detect the light signals provided by the wearable device 104-*b*. In yet other cases, communications/signals may be exchanged between the devices using other techniques, such as magnetic communications, galvanic communications, and the like.

In some cases, the wearable device 104-*b* (and/or the charging device 305-*b*) may be configured to identify a complete series of movements 510, and may compare the series of movements 510 (in its entirety) to the one or more predefined reference patterns 520. In such cases, the feedback 525 provided at step 550 may include a simple "positive" or "negative" indication as to whether or not the series of movements 510 matches the predefined reference pattern 520. For example, the wearable device 104-*b* may identify a series of movements 510, and determine that the wearable device 104-*b* has subsequently remained still for at least three seconds, thereby indicating a conclusion of the series of movements 510. Upon a conclusion of the series of movements 510, the wearable device 104-*b* may compare the full series of movements 510 to the one or more predefined reference patterns 520, and may generate signals to cause the wearable device 104-*b* and/or charging device 305-*b* to provide the feedback 525 indicating a final result of the comparison (e.g., match or no match).

In additional or alternative cases, the wearable device 104-*b* (and/or the charging device 305-*b*) may be configured to compare individual movements 515 of the series of movements 510 to corresponding reference movements of the predefined reference pattern 520 and provide feedback 525 in a step-by-step manner. For example, upon identifying the first movement 515-*a*, the wearable device 104-*b* may compare the first movement 515-*a* to the first reference movement of the predefined reference pattern 520. In this example, the wearable device 104-*b*, the charging device 305-*b*, or both, may provide first feedback 525-*a* that indicates whether the first movement 515-*a* matches the first reference movement. Continuing with the same example, the wearable device 104-*b* may identify the second movement 515-*b*, and compare the second movement 515-*b* to the second reference movement of the predefined reference pattern 520. In this example, the wearable device 104-*b*, the charging device 305-*b*, or both, may provide second feedback 525-*b* that indicates whether the second movement 515-*b* matches the second reference movement.

In some implementations of the "step-by-step" approach, the wearable device 104-*b* and/or the charging device 305-*b* may monitor for additional movements 515 of the series of movements 510 only if previous movements 515 match corresponding reference movements of the predefined reference pattern 520 (e.g., continue monitoring motion data for subsequent movements 515 only if previous movements were performed correctly). For instance, if the first movement 515-*a* was not performed correctly (e.g., does not match the first reference movement of the predefined reference pattern(s) 520), the first feedback 525-*a* may indicate that the first movement was not performed correctly, and the wearable device 104-*b* may stop monitoring or "looking" for additional movements until the user "restarts" by holding the wearable device 104-*b* and charging device 305-*b* still for at least five seconds. Conversely, if the first movement 515-*a* was performed correctly (e.g., matches the first reference movement of the predefined reference pattern(s) 520), the first feedback 525-*a* may indicate that the first movement was performed correctly, and the wearable device 104-*b* may continue monitoring or "looking" for the subsequent second movement 515-*b* (where the second movement 515-*b* will be evaluated in a similar step-by-step manner).

At step 555, the wearable device 104-*b* (and/or the charging device 305-*b*) may perform one or more control actions/functions if the series of movements 510 matches the predefined reference pattern 520.

The one or more control actions/functions may include, but are not limited to, performing a factory reset of the wearable device 104-*b*, performing a partial reset of the wearable device 104-*b*, running one or more diagnostic tests of the wearable device 104-*b*, uploading one or more settings or measurements (e.g., algorithms) to a memory of the wearable device 104-*b*, uploading one or more wearable applications to a memory of the wearable device 104-*b*, or any combination thereof. For example, in some cases, a control action may include a factory reset procedure at the wearable device 104-*b*, where the settings of the wearable device 104-*b* are erased and restored to factory settings (e.g., user-specific data erased, settings restored to default settings, etc.). By way of another example, a control action may include a diagnostics procedure in which the wearable device 104-*b* evaluates a performance, quality, or setting of one or more components of the wearable device 104-*b* (e.g., evaluate processors, memory, sensors, etc.). By way of yet another example, a control action may be used to upload a specific version of a wearable application 250 to the wearable device 104-*b* (e.g., an "experimental" version of the wearable application 250 that is reserved only for employees or a limited group of people).

As noted previously herein, in order to trigger the control actions at 555, the movements 515 within the series of movements 515 may be expected to: (1) be performed/detected while the wearable device 104-*b* is coupled with the charging device 305-*b*, (2) match the corresponding reference movements of the predefined reference pattern 520, (3) be performed in the correct order, and (4) be performed with the correct timing (e.g., satisfy "timing criteria" defined by the predefined reference pattern 520). That is, the series of movements 510 may only be determined to "match" the predefined reference pattern 520 if the respective movements 515 within the series of movements 510 match the respective reference movements within the predefined reference pattern 520, and only if a relative timing associated with each respective movement 515 of the series of movements 510 satisfy a timing criteria associated with each respective reference movement of the predefined reference pattern 520.

For example, to satisfy the predefined reference pattern 520, the user may be expected to manipulate the wearable device 104-*b* and the charging device 305-*b* in accordance with the five different "steps" shown and described in FIG. 5 (e.g., first static period, followed by first reference movement, followed by second static period, followed by second reference period, followed by third static period). In this example, in order for the predefined reference pattern 520 to be identified (thereby triggering the control action at step 555), the respective static periods and reference movements may be required to be performed in order and within certain time durations (e.g., time criteria) from one another. For instance, the second reference movement may be expected to be performed no later than five seconds following the first reference movement, and the static periods may be expected to last longer than a predefined minimum time threshold, but less than a predefined maximum time threshold.

Additionally, or alternatively, the respective reference movements of the predefined reference pattern 520 may not be separated by static periods (as shown), but rather the user may be expected or required to perform a certain quantity of movements 515 within some time frame (e.g., five movements 515 within five seconds). In this regard, the user may be expected to perform the series of movements 510 within some predefined time interval (e.g., five seconds) associated with the predefined reference pattern 520.

As noted previously herein, techniques of the present disclosure may be used to perform a factory reset and/or other control actions at the charging device 305-*b*, other associated devices (e.g., other wearable devices 104), or any combination thereof. For example, in some cases, initiation of a factory reset procedure (or other control action) may also initiate a factory reset procedure of the corresponding charging device 305-*b* and/or other associated devices, such as other wearable devices 104 that are paired with or otherwise associated with the wearable device 104-*b*.

At 560, the wearable device 104-*b*, the charging device 305-*b*, or both, may provide feedback 525 to the user, where the feedback indicates a result of the one or more control actions at 555. For example, the feedback at 525 may indicate whether or not the control actions were successfully performed, a result of the one or more control actions, or both. For instance, the charging device 305-*b* may flash LEDs different colors to indicate whether or not a factory reset was successfully performed, or may flash the LEDs different colors to indicate different results of a diagnostics procedure performed at 555. By way of another example, the charging device 305-*a* and/or the wearable device 104-*b* may make different sounds to indicate whether or not measurement parameters or settings were successfully uploaded to the wearable device 104-*b*.

As noted previously herein, in cases where the wearable device 104-*b* transmits signals to the charging device 305-*b* to provide the feedback 525 at 560, the wearable device 104-*b* may provide the signals via wireless signals (e.g., Bluetooth), via light-based signals (e.g., one-directional IR LEDs), or both. As such, any description associated with the feedback shown and described at 550 may be regarded as applying to the feedback at 560, unless noted otherwise herein.

A full example may prove to be illustrative. In some cases, in order to perform a factory reset for the wearable device 104-*b* (or perform some other control setting), a user may place the wearable device 104-*b* (e.g., wearable ring device) on the charging device 305-*b*, and wait for at least two seconds (e.g., static period). Subsequently, the user may turn the charging device 305-*b* with the wearable device 104-*b* 180° so that the charging device 305-*b* is upside down. The user may then wait until the LED on the charging device 305-*b* turns blue (feedback 525 at 550 to indicate successful completion of the respective step of the predefined reference pattern 520). The user may then turn the charging device 305-*b* with the wearable device 104-*b* 180° so that the charging device 305-*b* is right-side up. The user may then wait until the LED on the charging device 305-*b* turns red (feedback 525 at 550 to indicate successful completion of the respective step of the predefined reference pattern 520). Subsequently, the user may turn the charging device 305-*b* with the wearable device 104-*b* 180° so that the charging device 305-*b* is upside down. The user may then wait until the LED on the charging device 305-*b* turns magenta (feedback 525 at 550 to indicate successful completion of the respective step of the predefined reference pattern 520). The user may then turn the charging device 305-*b* with the wearable device 104-*b* 180° so that the charging device 305-*b* is right-side up. The user may then wait until the LED on the charging device 305-*b* turns yellow (feedback 525 at 550 to indicate successful completion of the respective step of the predefined reference pattern 520). The factory reset procedure may then begin once the LED on the charging device 305-*b* turns yellow, and the LEDs on the charging device 305-*b* may turn a different color once the factory reset procedure is complete.

Figure 6:
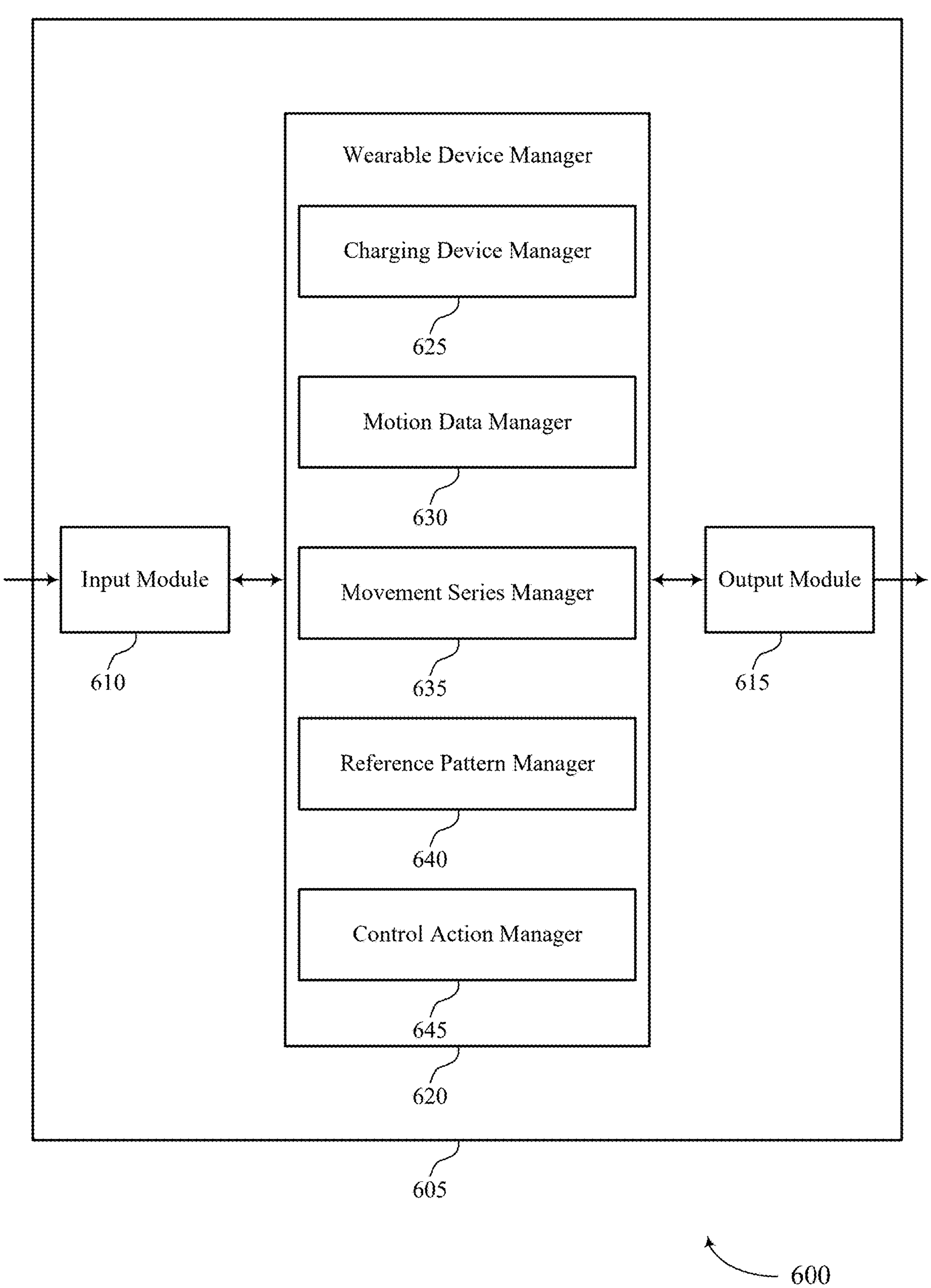
FIG. 6 shows a block diagram of an apparatus that supports techniques for device factory reset and other control functionalities in accordance with aspects of the present disclosure.

FIG. 6 shows a block diagram 600 of a device 605 that supports techniques for wearable device factory reset and other control functionalities in accordance with aspects of the present disclosure. The device 605 may include an input module 610, an output module 615, and a wearable device manager 620. The device 605, or one of more components of the device 605 (e.g., the input module 610, the output module 615, and the wearable device manager 620), may include at least one processor, which may be coupled with at least one memory, to support the described techniques. Each of these components may be in communication with one another (e.g., via one or more buses).

For example, the wearable device manager 620 may include a charging device manager 625, a motion data manager 630, a movement series manager 635, a reference pattern manager 640, a control action manager 645, or any combination thereof. In some examples, the wearable device manager 620, or various components thereof, may be configured to perform various operations (e.g., receiving, monitoring, transmitting) using or otherwise in cooperation with the input module 610, the output module 615, or both. For example, the wearable device manager 620 may receive information from the input module 610, send information to the output module 615, or be integrated in combination with the input module 610, the output module 615, or both to receive information, transmit information, or perform various other operations as described herein.

The charging device manager 625 may be configured as or otherwise support a means for detecting, using one or more processors of the wearable device, that the wearable device is coupled with a charging device. The motion data manager 630 may be configured as or otherwise support a means for acquiring motion data using one or more motion sensors of the wearable device, the motion data collected during a time interval that the wearable device is coupled with the charging device. The movement series manager 635 may be configured as or otherwise support a means for identifying, using the one or more processors and based at least in part on the motion data, a series of movements associated with the wearable device and the charging device during the time interval that the wearable device is coupled with the charging device. The reference pattern manager 640 may be configured as or otherwise support a means for comparing the series of movements to a predefined reference pattern. The control action manager 645 may be configured as or otherwise support a means for performing, using the one or more processors, one or more control actions associated with the wearable device based at least in part on the series of movements matching the predefined reference pattern.

Figure 7:
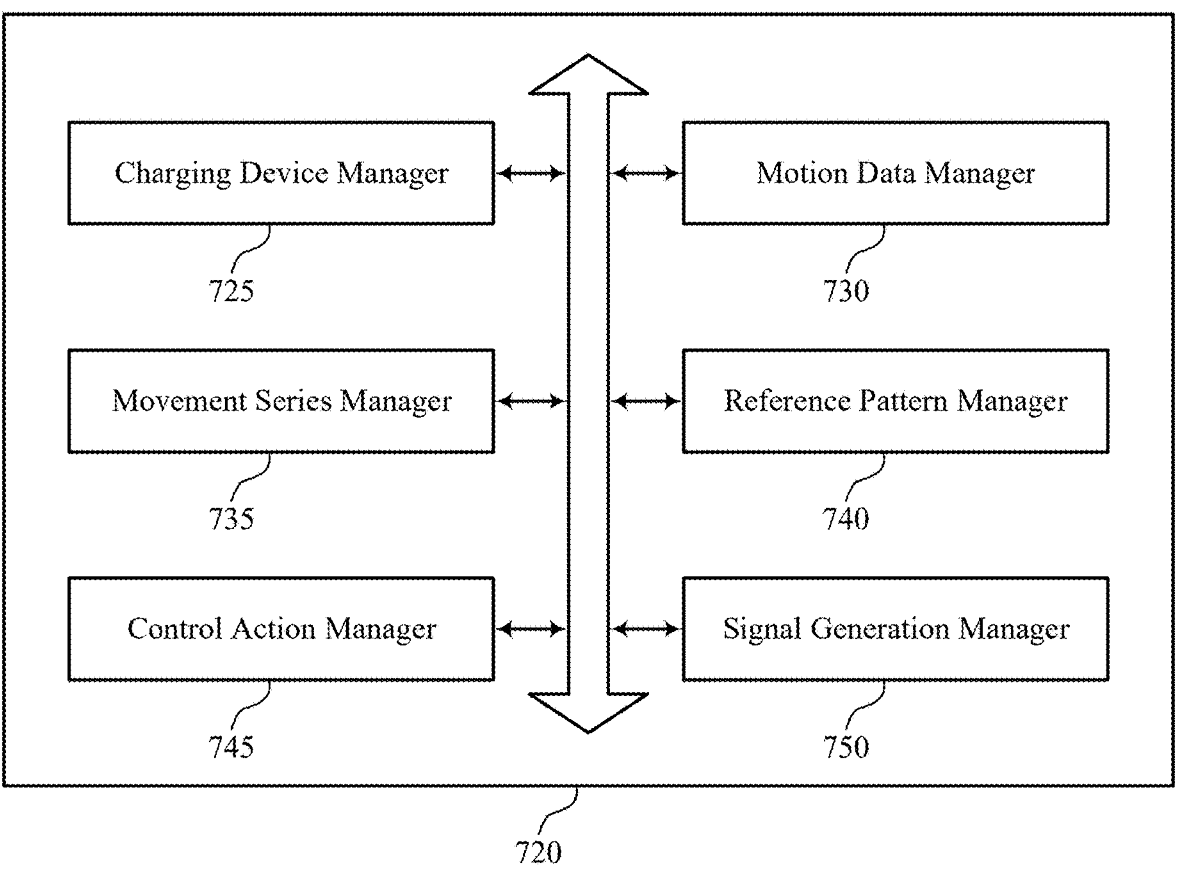
FIG. 7 shows a block diagram of a wearable device manager that supports techniques for device factory reset and other control functionalities in accordance with aspects of the present disclosure.

FIG. 7 shows a block diagram 700 of a wearable device manager 720 that supports techniques for device factory reset and other control functionalities in accordance with aspects of the present disclosure. The wearable device manager 720 may be an example of aspects of a wearable device manager or a wearable device manager 620, or both, as described herein. The wearable device manager 720, or various components thereof, may be an example of means for performing various aspects of techniques for wearable device factory reset and other control functionalities as described herein. For example, the wearable device manager 720 may include a charging device manager 725, a motion data manager 730, a movement series manager 735, a reference pattern manager 740, a control action manager 745, a signal generation manager 750, or any combination thereof. Each of these components, or components of sub-components thereof (e.g., one or more processors, one or more memories), may communicate, directly or indirectly, with one another (e.g., via one or more buses).

The charging device manager 725 may be configured as or otherwise support a means for detecting, using one or more processors of the wearable device, that the wearable device is coupled with a charging device. The motion data manager 730 may be configured as or otherwise support a means for acquiring motion data using one or more motion sensors of the wearable device, the motion data collected during a time interval that the wearable device is coupled with the charging device. The movement series manager 735 may be configured as or otherwise support a means for identifying, using the one or more processors and based at least in part on the motion data, a series of movements associated with the wearable device and the charging device during the time interval that the wearable device is coupled with the charging device. The reference pattern manager 740 may be configured as or otherwise support a means for comparing the series of movements to a predefined reference pattern. The control action manager 745 may be configured as or otherwise support a means for performing, using the one or more processors, one or more control actions associated with the wearable device based at least in part on the series of movements matching the predefined reference pattern.

In some examples, the signal generation manager 750 may be configured as or otherwise support a means for generating one or more signals configured to cause the wearable device, the charging device, or both, to provide feedback to a user based at least in part on comparing a first movement of the series of movements to a first reference movement of the predefined reference pattern.

In some examples, the feedback provided to the user comprises a first set of characteristics if the first movement matches the first reference movement, and a second set of characteristics if the first movement does not match the first reference movement.

In some examples, to support generating the one or more signals, the signal generation manager 750 may be configured as or otherwise support a means for communicating the one or more signals to the charging device, wherein the one or more signals are configured to cause one or more light-emitting components of the charging device, a haptic feedback component of the charging device, an audio feedback component of the charging device, or any combination thereof, to provide the feedback to the user.

In some examples, the one or more signals are communicated to the charging device via light emitted by one or more light-emitting components of the wearable device.

In some examples, the one or more signals are communicated to the charging device via wireless communication signals.

In some examples, the one or more signals are configured to cause one or more light-emitting components of the wearable device, a haptic feedback component of the wearable device, an audio feedback component of the wearable device, or any combination thereof, to provide the feedback to the user.

In some examples, the signal generation manager 750 may be configured as or otherwise support a means for generating one or more additional signals configured to cause the wearable device, the charging device, or both, to provide additional feedback to the user based at least in part on comparing a second movement of the series of movements to a second reference movement of the predefined reference pattern.

In some examples, the signal generation manager 750 may be configured as or otherwise support a means for generating one or more signals configured to cause the wearable device, the charging device, or both, to provide feedback to a user, the feedback indicating a result of the one or more control actions.

In some examples, the movement series manager 735 may be configured as or otherwise support a means for identifying a first movement associated with the series of movements based at least in part on acquiring the motion data. In some examples, the signal generation manager 750 may be configured as or otherwise support a means for generating one or more signals configured to cause the wearable device, the charging device, or both, to provide feedback to a user based at least in part on comparing the first movement of the series of movements to a first reference movement of the predefined reference pattern. In some examples, the motion data manager 730 may be configured as or otherwise support a means for monitoring the motion data for a second movement associated with the series of movements based at least in part on the first movement matching the first reference movement and based at least in part on providing the feedback to the user.

In some examples, the reference pattern manager 740 may be configured as or otherwise support a means for determining that the series of movements matches the predefined reference pattern based at least in part on a plurality of movements of the series of movements matching a plurality of reference movements of the predefined reference pattern, and based at least in part on a relative timing associated with each respective movement of the plurality of movements satisfying a timing criteria associated with each respective reference movement of the plurality of reference movements.

In some examples, the movement series manager 735 may be configured as or otherwise support a means for identifying, based at least in part on the motion data, a plurality of movements associated with the series of movements based at least in part on each movement of the plurality of movements being preceded by a first static period, followed by a second static period, or both.

In some examples, the charging device manager 725 may be configured as or otherwise support a means for determining that the wearable device is coupled with the charging device for an entirety of the time interval during which the motion data associated with the series of movements is acquired, wherein comparing the series of movements to the predefined reference pattern, performing the one or more control actions, or both, is based at least in part on the wearable device being coupled with the charging device for the entirety of the time interval during which the motion data associated with the series of movements is acquired.

In some examples, to support detecting that the wearable device is coupled with the charging device, the charging device manager 725 may be configured as or otherwise support a means for detecting an inductive load between the inductive charging component of the wearable device and the additional inductive charging component of the charging device.

In some examples, the charging device manager 725 may be configured as or otherwise support a means for performing a charging procedure with the charging device during the time interval that the motion data is collected, while the one or more control actions are performed, or both.

In some examples, the one or more control actions comprise performing a factory reset of the wearable device, running one or more diagnostic tests of the wearable device, uploading one or more settings to a memory of the wearable device, or any combination thereof.

In some examples, the predefined reference pattern comprises a default reference pattern associated with the wearable device.

In some examples, the motion data manager 730 may be configured as or otherwise support a means for receiving additional motion data collected via the wearable device, wherein the additional motion data is received during an additional time interval that the wearable device is coupled with the charging device or an additional charging device, the additional time interval prior to the time interval. In some examples, the reference pattern manager 740 may be configured as or otherwise support a means for generating the predefined reference pattern based at least in part on the additional motion data, wherein comparing the series of movements to the predefined reference pattern is based at least in part on generating the predefined reference pattern, wherein the predefined reference pattern is generated based at least in part on the additional motion data being collected during the additional time interval that the wearable device is coupled with the charging device or an additional charging device.

In some examples, the wearable device comprises a wearable ring device.

Figure 8:
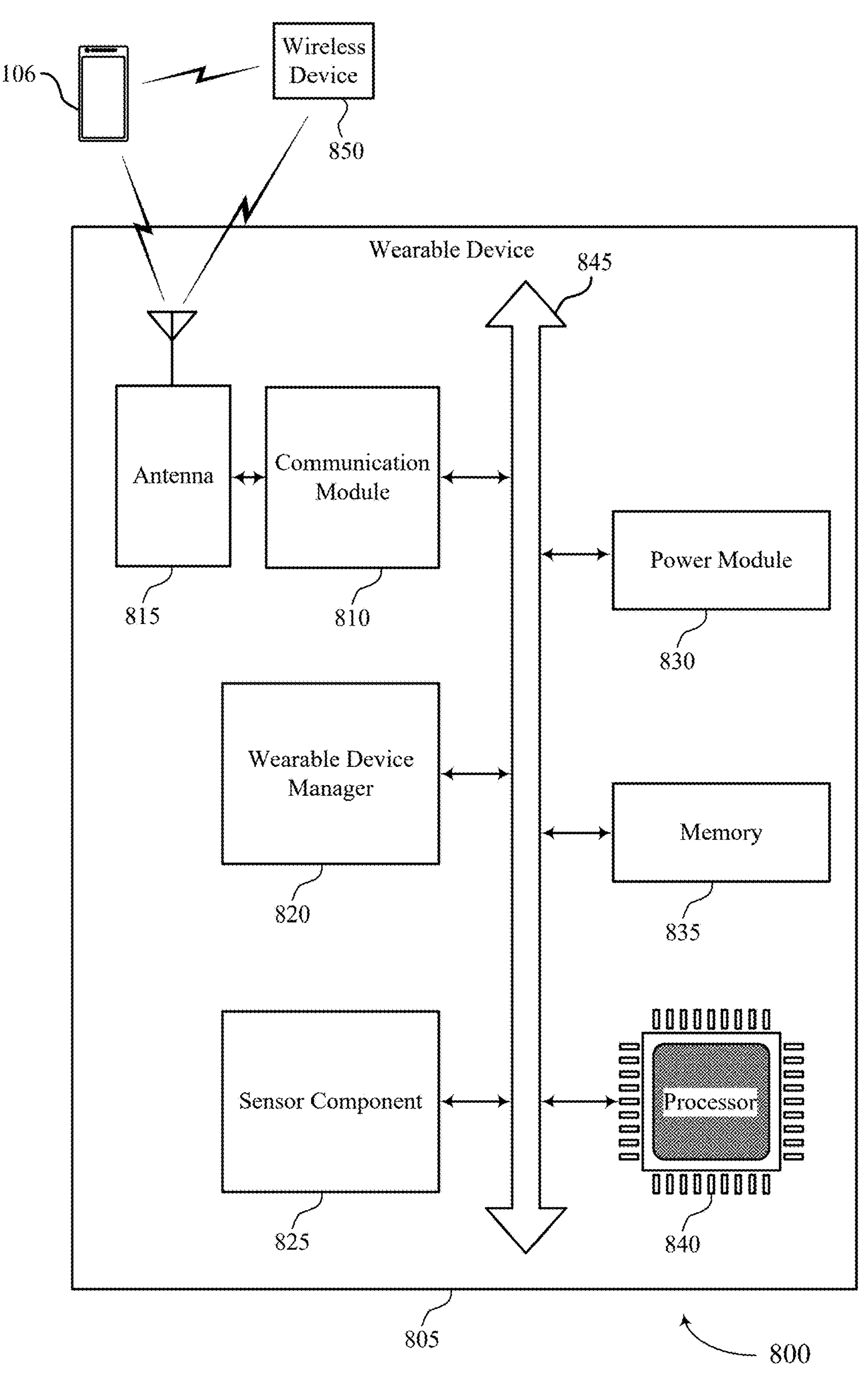
FIG. 8 shows a diagram of a system including a device that supports techniques for device factory reset and other control functionalities in accordance with aspects of the present disclosure.

FIG. 8 shows a diagram of a system 800 including a device 805 that supports techniques for device factory reset and other control functionalities in accordance with aspects of the present disclosure. The device 805 may be an example of or include the components of a device 605 as described herein. The device 805 may include an example of a wearable device 104, as described previously herein. The device 805 may include components for bi-directional communications including components for transmitting and receiving communications with a user device 106 and a server 110, such as a wearable device manager 820, a communication module 810, an antenna 815, a sensor component 825, a power module 830, at least one memory 835, at least one processor 840, and a wireless device 850. These components may be in electronic communication or otherwise coupled (e.g., operatively, communicatively, functionally, electronically, electrically) via one or more buses (e.g., a bus 845).

For example, the wearable device manager 820 may be configured as or otherwise support a means for detecting, using one or more processors of the wearable device, that the wearable device is coupled with a charging device. The wearable device manager 820 may be configured as or otherwise support a means for acquiring motion data using one or more motion sensors of the wearable device, the motion data collected during a time interval that the wearable device is coupled with the charging device. The wearable device manager 820 may be configured as or otherwise support a means for identifying, using the one or more processors and based at least in part on the motion data, a series of movements associated with the wearable device and the charging device during the time interval that the wearable device is coupled with the charging device. The wearable device manager 820 may be configured as or otherwise support a means for comparing the series of movements to a predefined reference pattern. The wearable device manager 820 may be configured as or otherwise support a means for performing, using the one or more processors, one or more control actions associated with the wearable device based at least in part on the series of movements matching the predefined reference pattern.

Figure 9:
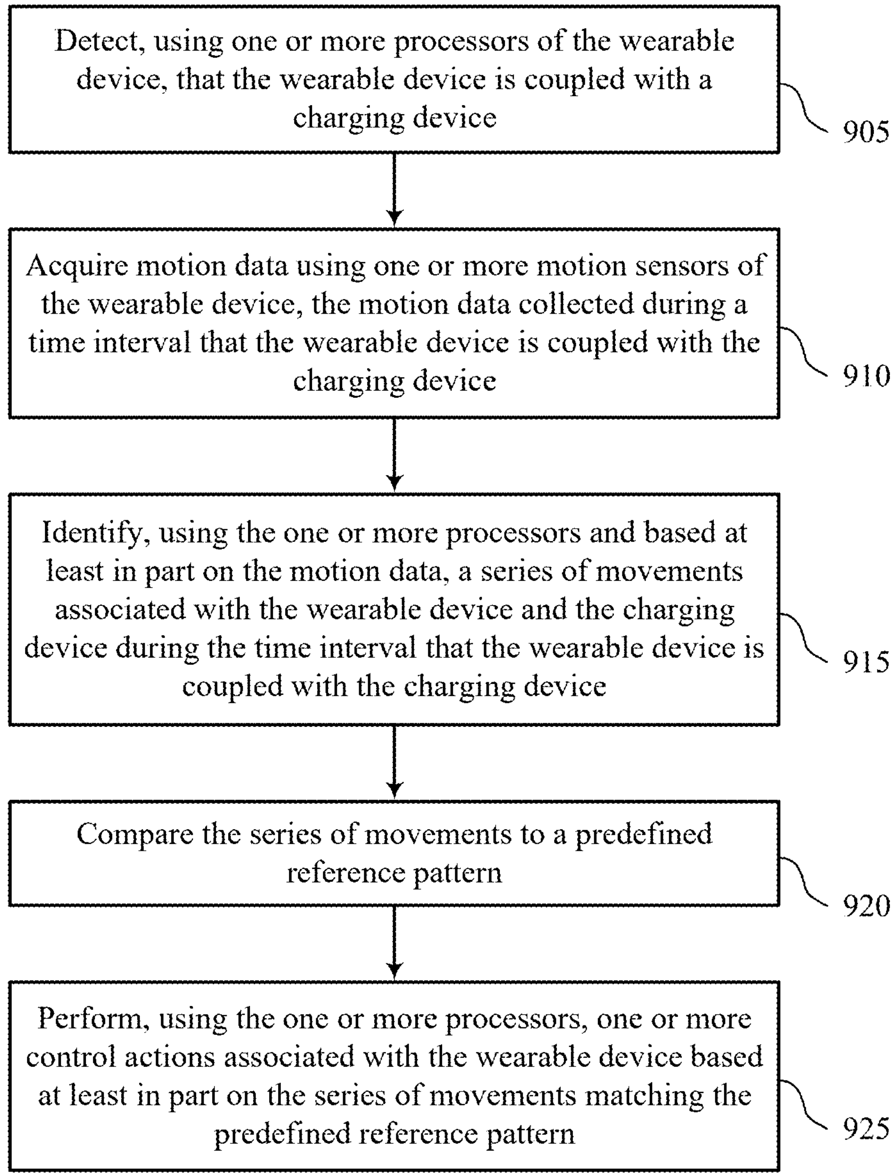
FIGS. 9 and 10 show flowcharts illustrating methods that support techniques for device factory reset and other control functionalities in accordance with aspects of the present disclosure.

FIG. 9 shows a flowchart illustrating a method 900 that supports techniques for wearable device factory reset and other control functionalities in accordance with aspects of the present disclosure. The operations of the method 900 may be implemented by a wearable device or its components as described herein. For example, the operations of the method 900 may be performed by a wearable device as described with reference to FIGS. 1 through 8. In some examples, a wearable device may execute a set of instructions to control the functional elements of the wearable device to perform the described functions. Additionally, or alternatively, the wearable device may perform aspects of the described functions using special-purpose hardware.

At 905, the method may include detecting, using one or more processors of the wearable device, that the wearable device is coupled with a charging device. The operations of block 905 may be performed in accordance with examples as disclosed herein. In some examples, aspects of the operations of 905 may be performed by a charging device manager 725 as described with reference to FIG. 7.

At 910, the method may include acquiring motion data using one or more motion sensors of the wearable device, the motion data collected during a time interval that the wearable device is coupled with the charging device. The operations of block 910 may be performed in accordance with examples as disclosed herein. In some examples, aspects of the operations of 910 may be performed by a motion data manager 730 as described with reference to FIG. 7.

At 915, the method may include identifying, using the one or more processors and based at least in part on the motion data, a series of movements associated with the wearable device and the charging device during the time interval that the wearable device is coupled with the charging device. The operations of block 915 may be performed in accordance with examples as disclosed herein. In some examples, aspects of the operations of 915 may be performed by a movement series manager 735 as described with reference to FIG. 7.

At 920, the method may include comparing the series of movements to a predefined reference pattern. The operations of block 920 may be performed in accordance with examples as disclosed herein. In some examples, aspects of the operations of 920 may be performed by a reference pattern manager 740 as described with reference to FIG. 7.

At 925, the method may include performing, using the one or more processors, one or more control actions associated with the wearable device based at least in part on the series of movements matching the predefined reference pattern. The operations of block 925 may be performed in accordance with examples as disclosed herein. In some examples, aspects of the operations of 925 may be performed by a control action manager 745 as described with reference to FIG. 7.

Figure 10:
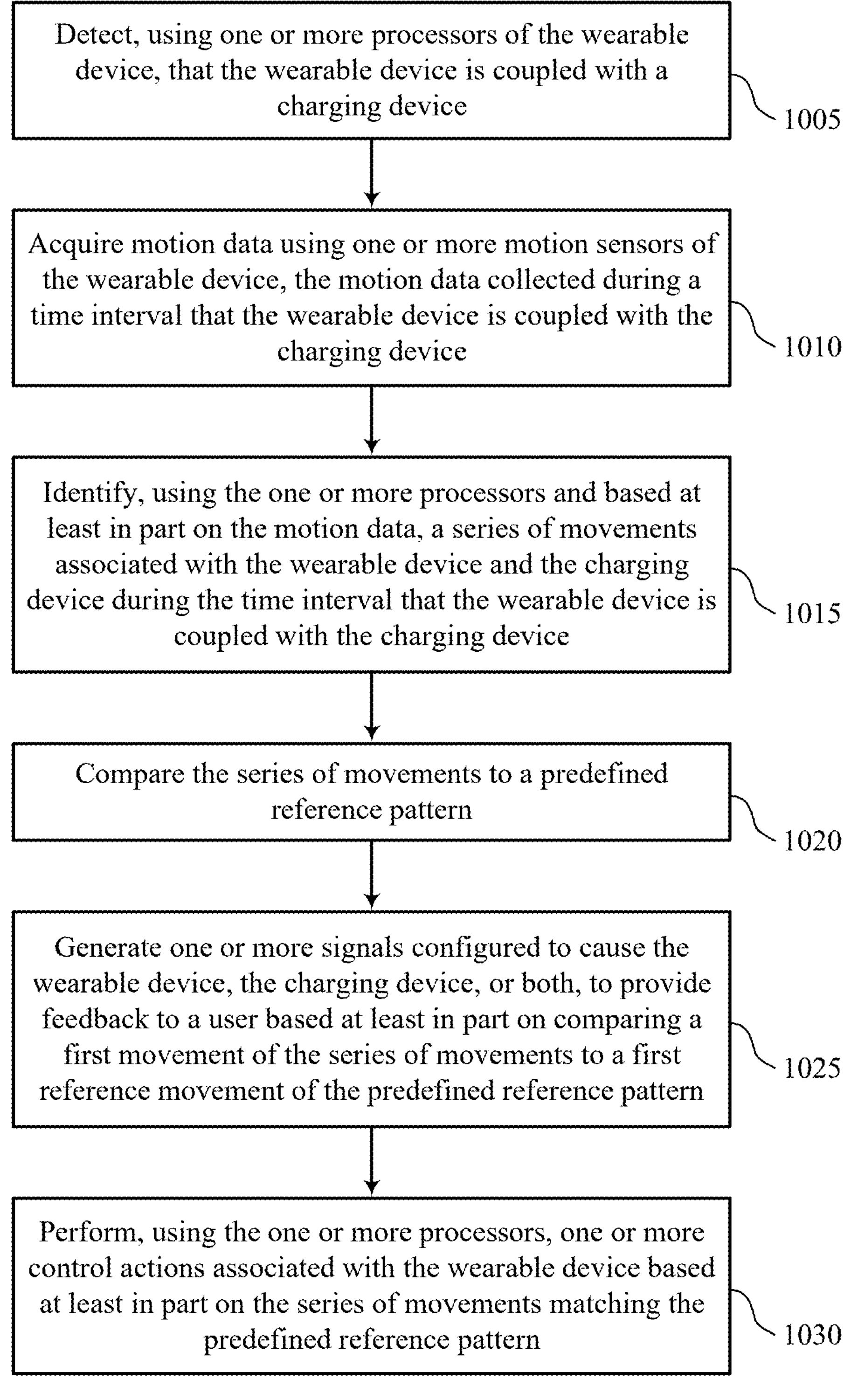

FIG. 10 shows a flowchart illustrating a method 1000 that supports techniques for device factory reset and other control functionalities in accordance with aspects of the present disclosure. The operations of the method 1000 may be implemented by a wearable device or its components as described herein. For example, the operations of the method 1000 may be performed by a wearable device as described with reference to FIGS. 1 through 8. In some examples, a wearable device may execute a set of instructions to control the functional elements of the wearable device to perform the described functions. Additionally, or alternatively, the wearable device may perform aspects of the described functions using special-purpose hardware.

At 1005, the method may include detecting, using one or more processors of the wearable device, that the wearable device is coupled with a charging device. The operations of block 1005 may be performed in accordance with examples as disclosed herein. In some examples, aspects of the operations of 1005 may be performed by a charging device manager 725 as described with reference to FIG. 7.

At 1010, the method may include acquiring motion data using one or more motion sensors of the wearable device, the motion data collected during a time interval that the wearable device is coupled with the charging device. The operations of block 1010 may be performed in accordance with examples as disclosed herein. In some examples, aspects of the operations of 1010 may be performed by a motion data manager 730 as described with reference to FIG. 7.

At 1015, the method may include identifying, using the one or more processors and based at least in part on the motion data, a series of movements associated with the wearable device and the charging device during the time interval that the wearable device is coupled with the charging device. The operations of block 1015 may be performed in accordance with examples as disclosed herein. In some examples, aspects of the operations of 1015 may be performed by a movement series manager 735 as described with reference to FIG. 7.

At 1020, the method may include comparing the series of movements to a predefined reference pattern. The operations of block 1020 may be performed in accordance with examples as disclosed herein. In some examples, aspects of the operations of 1020 may be performed by a reference pattern manager 740 as described with reference to FIG. 7.

At 1025, the method may include generating one or more signals configured to cause the wearable device, the charging device, or both, to provide feedback to a user based at least in part on comparing a first movement of the series of movements to a first reference movement of the predefined reference pattern. The operations of block 1025 may be performed in accordance with examples as disclosed herein. In some examples, aspects of the operations of 1025 may be performed by a signal generation manager 750 as described with reference to FIG. 7.

At 1030, the method may include performing, using the one or more processors, one or more control actions associated with the wearable device based at least in part on the series of movements matching the predefined reference pattern. The operations of block 1030 may be performed in accordance with examples as disclosed herein. In some examples, aspects of the operations of 1030 may be performed by a control action manager 745 as described with reference to FIG. 7.

It should be noted that the methods described above describe possible implementations, and that the operations and the steps may be rearranged or otherwise modified and that other implementations are possible. Furthermore, aspects from two or more of the methods may be combined.

A method by a wearable device is described. The method may include detecting, using one or more processors of the wearable device, that the wearable device is coupled with a charging device, acquiring motion data using one or more motion sensors of the wearable device, the motion data collected during a time interval that the wearable device is coupled with the charging device, identifying, using the one or more processors and based at least in part on the motion data, a series of movements associated with the wearable device and the charging device during the time interval that the wearable device is coupled with the charging device, comparing the series of movements to a predefined reference pattern, and performing, using the one or more processors, one or more control actions associated with the wearable device based at least in part on the series of movements matching the predefined reference pattern.

A wearable device is described. The wearable device may include one or more memories storing processor executable code, and one or more processors coupled with the one or more memories. The one or more processors may individually or collectively operable to execute the code to cause the wearable device to detect, using one or more processors of the wearable device, that the wearable device is coupled with a charging device, acquire motion data using one or more motion sensors of the wearable device, the motion data collected during a time interval that the wearable device is coupled with the charging device, identify, using the one or more processors and based at least in part on the motion data, a series of movements associated with the wearable device and the charging device during the time interval that the wearable device is coupled with the charging device, compare the series of movements to a predefined reference pattern, and perform, using the one or more processors, one or more control actions associated with the wearable device based at least in part on the series of movements matching the predefined reference pattern.

Another wearable device is described. The wearable device may include means for detecting, using one or more processors of the wearable device, that the wearable device is coupled with a charging device, means for acquiring motion data using one or more motion sensors of the wearable device, the motion data collected during a time interval that the wearable device is coupled with the charging device, means for identifying, using the one or more processors and based at least in part on the motion data, a series of movements associated with the wearable device and the charging device during the time interval that the wearable device is coupled with the charging device, means for comparing the series of movements to a predefined reference pattern, and means for performing, using the one or more processors, one or more control actions associated with the wearable device based at least in part on the series of movements matching the predefined reference pattern.

A non-transitory computer-readable medium storing code is described. The code may include instructions executable by one or more processors to detect, using one or more processors of the wearable device, that the wearable device is coupled with a charging device, acquire motion data using one or more motion sensors of the wearable device, the motion data collected during a time interval that the wearable device is coupled with the charging device, identify, using the one or more processors and based at least in part on the motion data, a series of movements associated with the wearable device and the charging device during the time interval that the wearable device is coupled with the charging device, compare the series of movements to a predefined reference pattern, and perform, using the one or more processors, one or more control actions associated with the wearable device based at least in part on the series of movements matching the predefined reference pattern.

Some examples of the method, wearable devices, and non-transitory computer-readable medium described herein may further include operations, features, means, or instructions for generating one or more signals configured to cause the wearable device, the charging device, or both, to provide feedback to a user based at least in part on comparing a first movement of the series of movements to a first reference movement of the predefined reference pattern.

In some examples of the method, wearable devices, and non-transitory computer-readable medium described herein, the feedback provided to the user comprises a first set of characteristics if the first movement matches the first reference movement, and a second set of characteristics if the first movement does not match the first reference movement.

In some examples of the method, wearable devices, and non-transitory computer-readable medium described herein, generating the one or more signals may include operations, features, means, or instructions for communicating the one or more signals to the charging device, wherein the one or more signals may be configured to cause one or more light-emitting components of the charging device, a haptic feedback component of the charging device, an audio feedback component of the charging device, or any combination thereof, to provide the feedback to the user.

In some examples of the method, wearable devices, and non-transitory computer-readable medium described herein, the one or more signals may be communicated to the charging device via light emitted by one or more light-emitting components of the wearable device.

In some examples of the method, wearable devices, and non-transitory computer-readable medium described herein, the one or more signals may be communicated to the charging device via wireless communication signals.

In some examples of the method, wearable devices, and non-transitory computer-readable medium described herein, the one or more signals may be configured to cause one or more light-emitting components of the wearable device, a haptic feedback component of the wearable device, an audio feedback component of the wearable device, or any combination thereof, to provide the feedback to the user.

Some examples of the method, wearable devices, and non-transitory computer-readable medium described herein may further include operations, features, means, or instructions for generating one or more additional signals configured to cause the wearable device, the charging device, or both, to provide additional feedback to the user based at least in part on comparing a second movement of the series of movements to a second reference movement of the predefined reference pattern.

Some examples of the method, wearable devices, and non-transitory computer-readable medium described herein may further include operations, features, means, or instructions for generating one or more signals configured to cause the wearable device, the charging device, or both, to provide feedback to a user, the feedback indicating a result of the one or more control actions.

Some examples of the method, wearable devices, and non-transitory computer-readable medium described herein may further include operations, features, means, or instructions for identifying a first movement associated with the series of movements based at least in part on acquiring the motion data, generating one or more signals configured to cause the wearable device, the charging device, or both, to provide feedback to a user based at least in part on comparing the first movement of the series of movements to a first reference movement of the predefined reference pattern, and monitoring the motion data for a second movement associated with the series of movements based at least in part on the first movement matching the first reference movement and based at least in part on providing the feedback to the user.

Some examples of the method, wearable devices, and non-transitory computer-readable medium described herein may further include operations, features, means, or instructions for determining that the series of movements matches the predefined reference pattern based at least in part on a plurality of movements of the series of movements matching a plurality of reference movements of the predefined reference pattern, and based at least in part on a relative timing associated with each respective movement of the plurality of movements satisfying a timing criteria associated with each respective reference movement of the plurality of reference movements.

In some examples of the method, wearable devices, and non-transitory computer-readable medium described herein, identifying, based at least in part on the motion data, a plurality of movements associated with the series of movements based at least in part on each movement of the plurality of movements being preceded by a first static period, followed by a second static period, or both.

Some examples of the method, wearable devices, and non-transitory computer-readable medium described herein may further include operations, features, means, or instructions for determining that the wearable device may be coupled with the charging device for an entirety of the time interval during which the motion data associated with the series of movements may be acquired, wherein comparing the series of movements to the predefined reference pattern, performing the one or more control actions, or both, may be based at least in part on the wearable device being coupled with the charging device for the entirety of the time interval during which the motion data associated with the series of movements may be acquired.

In some examples of the method, wearable devices, and non-transitory computer-readable medium described herein, detecting that the wearable device may be coupled with the charging device may include operations, features, means, or instructions for detecting an inductive load between the inductive charging component of the wearable device and the additional inductive charging component of the charging device.

Some examples of the method, wearable devices, and non-transitory computer-readable medium described herein may further include operations, features, means, or instructions for performing a charging procedure with the charging device during the time interval that the motion data may be collected, while the one or more control actions may be performed, or both.

In some examples of the method, wearable devices, and non-transitory computer-readable medium described herein, the one or more control actions comprise performing a factory reset of the wearable device, running one or more diagnostic tests of the wearable device, uploading one or more settings to a memory of the wearable device, or any combination thereof.

In some examples of the method, wearable devices, and non-transitory computer-readable medium described herein, the predefined reference pattern comprises a default reference pattern associated with the wearable device.

Some examples of the method, wearable devices, and non-transitory computer-readable medium described herein may further include operations, features, means, or instructions for receiving additional motion data collected via the wearable device, wherein the additional motion data may be received during an additional time interval that the wearable device may be coupled with the charging device or an additional charging device, the additional time interval prior to the time interval and generating the predefined reference pattern based at least in part on the additional motion data, wherein comparing the series of movements to the predefined reference pattern may be based at least in part on generating the predefined reference pattern, wherein the predefined reference pattern may be generated based at least in part on the additional motion data being collected during the additional time interval that the wearable device may be coupled with the charging device or an additional charging device.

In some examples of the method, wearable devices, and non-transitory computer-readable medium described herein, the wearable device comprises a wearable ring device.

Another apparatus device is described. The apparatus may include a battery, a charging component communicatively coupled with the battery, the charging component configured to transfer power from a charging device to the battery, one or more motion sensors, one or more processors communicatively coupled with the battery, the charging component, the one or more motion sensors, or any combination thereof, wherein the one or more processors are configured to, detect that the wearable device is coupled with the charging device based at least in part on one or more signals received from the charging component, acquire motion data from the one or more motion sensors of the wearable device, the motion data collected during a time interval that the wearable device is coupled with the charging device, identify, based at least in part on the motion data, a series of movements associated with the wearable device and the charging device during the time interval that the wearable device is coupled with the charging device, compare the series of movements to a predefined reference pattern, and perform one or more control actions associated with the wearable device based at least in part on the series of movements matching the predefined reference pattern.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for performing control actions at one or more devices, comprising:

detecting, using one or more processors of a wearable device, a charging device, or both, that the wearable device is coupled with the charging device in a charging position that facilitates charging between the wearable device and the charging device;

acquiring motion data using one or more motion sensors of the wearable device, the charging device, or both, the motion data collected during a time interval that the wearable device is in the charging position with the charging device;

identifying, using the one or more processors and based at least in part on the motion data, a series of movements associated with the wearable device and the charging device during the time interval that the wearable device is in the charging position with the charging device;

performing, using the one or more processors, one or more control actions associated with the wearable device, the charging device, an additional device, or any combination thereof, based at least in part on the series of movements matching a predefined reference pattern, wherein the series of movements matches the predefined reference pattern based at least in part on a plurality of movements of the series of movements matching a plurality of reference movements of the predefined reference pattern, and based at least in part on a relative timing associated with the plurality of movements satisfying a timing criteria associated with the plurality of reference movements, wherein the one or more control actions comprise performing a factory reset during which setting data, user data, or both, are removed from the wearable device to restore factory settings at the wearable device; and generating one or more signals configured to cause the wearable device, the charging device, or both, to provide feedback indicating a result of the factory reset.

2. The method of claim 1, further comprising:

generating one or more signals configured to cause the wearable device, the charging device, or both, to provide feedback to a user based at least in part on comparing a first movement of the series of movements to a first reference movement of the predefined reference pattern.

3. The method of claim 2, wherein the feedback provided to the user comprises a first set of characteristics if the first movement matches the first reference movement, and a second set of characteristics if the first movement does not match the first reference movement.

4. The method of claim 2, wherein generating the one or more signals comprises:

communicating the one or more signals from the wearable device to the charging device, wherein the one or more signals are configured to cause one or more light-emitting components of the charging device, a haptic feedback component of the charging device, an audio feedback component of the charging device, or any combination thereof, to provide the feedback to the user.

5. The method of claim 4, wherein the one or more signals are communicated from the wearable device to the charging device via light emitted by one or more light-emitting components of the wearable device.

6. The method of claim 4, wherein the one or more signals are communicated to the charging device via wireless communication signals.

7. The method of claim 2, wherein the one or more signals are configured to cause one or more light-emitting components of the wearable device, a haptic feedback component of the wearable device, an audio feedback component of the wearable device, or any combination thereof, to provide the feedback to the user.

8. The method of claim 2, further comprising:

generating one or more additional signals configured to cause the wearable device, the charging device, or both, to provide additional feedback to the user based at least in part on comparing a second movement of the series of movements to a second reference movement of the predefined reference pattern.

9. The method of claim 1, wherein the plurality of movements satisfy the timing criteria based at least in part on:

one or more static periods between respective movements of the series of movements satisfying at least one of a minimum time threshold or a maximum time threshold, or the series of movements being performed within a predefined time duration associated with the predefined reference pattern.

10. The method of claim 1, further comprising:

identifying, based at least in part on the motion data, a plurality of movements associated with the series of movements based at least in part on each movement of the plurality of movements being preceded by a first static period, followed by a second static period, or both.

11. The method of claim 1, further comprising:

determining that the wearable device is coupled with the charging device for an entirety of the time interval during which the motion data associated with the series of movements is acquired, wherein comparing the series of movements to the predefined reference pattern, performing the one or more control actions, or both, is based at least in part on the wearable device being coupled with the charging device for the entirety of the time interval during which the motion data associated with the series of movements is acquired.

12. The method of claim 1, wherein the wearable device comprises an inductive charging component configured to wirelessly couple with an additional inductive charging component of the charging device, wherein detecting that the wearable device is coupled with the charging device comprises:

detecting an inductive load between the inductive charging component of the wearable device and the additional inductive charging component of the charging device based at least in part on the wearable device being in the charging position.

13. The method of claim 1, further comprising:

performing a charging procedure with the charging device during the time interval that the motion data is collected, while the one or more control actions are performed, or both.

14. The method of claim 1, wherein the motion data indicates a first series of movements associated with the wearable device and a second series of movements associated with the charging device, wherein the first series of movements corresponds to the second series of movements based at least in part on the wearable device being in the charging position.

15. The method of claim 1, further comprising:

receiving additional motion data collected via the wearable device, wherein the additional motion data is received during an additional time interval that the wearable device is coupled with the charging device or an additional charging device, the additional time interval prior to the time interval; and generating the predefined reference pattern based at least in part on the additional motion data, wherein comparing the series of movements to the predefined reference pattern is based at least in part on generating the predefined reference pattern, wherein the predefined reference pattern is generated based at least in part on the additional motion data being collected during the additional time interval that the wearable device is coupled with the charging device or an additional charging device.

16. The method of claim 1, wherein the wearable device comprises a wearable ring device.

17. A method for performing control actions at one or more devices, further comprising:

detecting, using one or more processors of a wearable device, a charging device, or both, that the wearable device is coupled with the charging device in a charging position that facilitates charging between the wearable device and the charging device;

acquiring motion data using one or more motion sensors of the wearable device, the charging device, or both, the motion data collected during a time interval that the wearable device is in the charging position with the charging device;

identifying, using the one or more processors and based at least in part on the motion data, a series of movements associated with the wearable device and the charging device during the time interval that the wearable device is in the charging position with the charging device;

identifying, using the one or more processors and based at least in part on the motion data, a first movement associated with a series of movements, the series of movements associated with the wearable device and the charging device during the time interval that the wearable device is in the charging position with the charging device;

generating one or more signals configured to cause the wearable device, the charging device, or both, to provide feedback to a user based at least in part on comparing the first movement of the series of movements to a first reference movement of a predefined reference pattern;

monitoring the motion data for a second movement associated with the series of movements based at least in part on the first movement matching the first reference movement and based at least in part on providing the feedback to the user;

performing, using the one or more processors, one or more control actions associated with the wearable device, the charging device, an additional device, or any combination thereof, based at least in part on the series of movements matching the predefined reference pattern, the series of movements comprising at least the first movement and the second movement, wherein the one or more control actions comprise performing a factory reset during which setting data, user data, or both, are removed from the wearable device to restore factory settings at the wearable device; and generating one or more additional signals configured to cause the wearable device, the charging device, or both, to provide additional feedback indicating a result of the factory reset.

18. A wearable device, comprising:

a battery;

a charging component communicatively coupled with the battery, the charging component configured to transfer power from a charging device to the battery;

one or more motion sensors; and one or more processors communicatively coupled with the battery, the charging component, the one or more motion sensors, or any combination thereof, wherein the one or more processors are configured to:

detect that the wearable device is coupled with the charging device in a charging position that facilitates charging between the wearable device and the charging device based at least in part on one or more signals received from the charging component;

acquire motion data from the one or more motion sensors of the wearable device, the motion data collected during a time interval that the wearable device is in the charging position with the charging device;

identify, based at least in part on the motion data, a series of movements associated with the wearable device and the charging device during the time interval that the wearable device is in the charging position with the charging device;

perform, using the one or more processors, one or more control actions associated with the wearable device, the charging device, an additional device, or any combination thereof, based at least in part on the series of movements matching a predefined reference pattern, wherein the series of movements matches the predefined reference pattern based at least in part on a plurality of movements of the series of movements matching a plurality of reference movements of the predefined reference pattern, and based at least in part on a relative timing associated with the plurality of movements satisfying a timing criteria associated with the plurality of reference movements, wherein the one or more control actions comprise performing a factory reset during which setting data, user data, or both, are removed from the wearable device to restore factory settings at the wearable device; and generate one or more signals configured to cause the wearable device, the charging device, or both, to provide feedback indicating a result of the factory reset.

* * * * *